(12) United States Patent
Ito et al.

(10) Patent No.: US 10,698,296 B2
(45) Date of Patent: Jun. 30, 2020

(54) INTERCHANGEABLE LENS AND DRIVING METHOD THEREOF, AND ELECTRONIC APPARATUS

(71) Applicant: Sony Corporation, Tokyo (JP)

(72) Inventors: Tomoomi Ito, Kanagawa (JP); Toru Katagiri, Tokyo (JP)

(73) Assignee: Sony Corporation, Tokyo (JP)

( * ) Notice: Subject to any disclaimer, the term of this patent is extended or adjusted under 35 U.S.C. 154(b) by 571 days.

(21) Appl. No.: 15/159,896

(22) Filed: May 20, 2016

(65) Prior Publication Data

US 2017/0219913 A1  Aug. 3, 2017

(30) Foreign Application Priority Data

Feb. 2, 2016 (JP) .................................. 2016-018395

(51) Int. Cl.
*G03B 13/36* (2006.01)
*G03B 17/14* (2006.01)
(Continued)

(52) U.S. Cl.
CPC ............... *G03B 13/36* (2013.01); *G02B 7/36* (2013.01); *G03B 3/10* (2013.01); *G03B 17/14* (2013.01); *H04N 5/23209* (2013.01); *H04N 5/23212* (2013.01); *H04N 5/23245* (2013.01); *G02B 7/14* (2013.01)

(58) Field of Classification Search
CPC .......... G02B 7/00; G02B 7/003; G02B 7/005; G02B 7/008; G02B 7/02; G02B 7/021; G02B 7/023; G02B 7/04; G02B 7/08; G02B 7/09; G02B 7/10; G02B 7/102; G02B 7/28; G02B 7/285

USPC ........ 359/694, 696–698, 808, 811, 813–814, 359/819, 822–825
See application file for complete search history.

(56) References Cited

U.S. PATENT DOCUMENTS

| | | | |
|---|---|---|---|
| 5,412,507 A | * | 5/1995 | Sato ..................... G02B 15/173 359/687 |
| 2001/0012074 A1 | | 8/2001 | Ohkawara |

(Continued)

FOREIGN PATENT DOCUMENTS

| | | |
|---|---|---|
| JP | 9-33788 A | 2/1997 |
| JP | 11-52215 | 2/1999 |

(Continued)

OTHER PUBLICATIONS

Office Action dated Jun. 20, 2019 in Japanese Patent Application No. 2016-018395.

*Primary Examiner* — Robert E. Tallman
(74) *Attorney, Agent, or Firm* — Oblon, McClelland, Maier & Neustadt, L.L.P.

(57) ABSTRACT

Provided is an interchangeable lens including: a lens position detection unit configured to detect a position of a lens; a motor configured to move a movable lens frame to which the lens is fixed; a driving state detection unit configured to detect a driving state of the motor; and a control unit configured to decide a driving speed of the motor based on a difference between a target speed, which is based on a difference between a target position of the lens acquired from an imaging device and the position of the lens detected by the lens position detection unit, and a speed according to the driving state detected by the driving state detection unit.

22 Claims, 12 Drawing Sheets

(51) Int. Cl.
  *H04N 5/232* (2006.01)
  *G03B 3/10* (2006.01)
  *G02B 7/36* (2006.01)
  *G02B 7/14* (2006.01)

(56) References Cited

U.S. PATENT DOCUMENTS

| | | | | |
|---|---|---|---|---|
| 2007/0132861 A1* | 6/2007 | Furuki | .................... | G02B 7/28 |
| | | | | 348/231.3 |
| 2013/0308038 A1* | 11/2013 | Miyajima | ................ | G02B 7/34 |
| | | | | 348/345 |
| 2015/0070564 A1* | 3/2015 | Okawa | .................... | G01D 5/12 |
| | | | | 348/345 |
| 2018/0081148 A1* | 3/2018 | Tomita | .................... | G02B 7/02 |

FOREIGN PATENT DOCUMENTS

| | | | |
|---|---|---|---|
| JP | 11-249745 | A | 9/1999 |
| JP | 2006-146067 | A | 6/2006 |
| JP | 2008-3501 | A | 1/2008 |
| JP | 2009-139840 | | 6/2009 |
| JP | 2009-244375 | A | 10/2009 |
| JP | 2014-32334 | A | 2/2014 |
| JP | 2015-104255 | A | 6/2015 |

* cited by examiner

INTERCHANGEABLE LENS AND DRIVING METHOD THEREOF, AND ELECTRONIC APPARATUS

CROSS REFERENCE TO RELATED APPLICATIONS

This application claims the benefit of Japanese Priority Patent Application JP 2016-018395 filed Feb. 2, 2016, the entire contents of which are incorporated herein by reference.

BACKGROUND

The present technology relates to an interchangeable lens and a driving method thereof, and an electronic apparatus, and particularly relates to an interchangeable lens and a driving method thereof, and an electronic apparatus that enables focusing with higher accuracy.

In the related art, contrast AF is known as an autofocus (hereinafter also referred to simply as AF) control method in which focusing is performed at the time of image capturing (for example, see JP 2009-139840A).

In the contrast AF, focus control is performed based on a contrast evaluation value obtained from a captured image.

Specifically, images are captured while a focus lens is continuously moved, contrast evaluation values of the images captured at respective positions of the focus lens are calculated, and then the position of the focus lens with the maximum contrast value is detected as a peak position. Then, the focus lens is moved to the detected peak position, and thereby a state in which a predetermined subject is focused on, i.e., the focused state, is created.

SUMMARY

In the contrast AF, however, it is important to exactly detect a position of a focus lens to perform more accurate focusing, unlike in phase difference AF. This is because a peak position is deduced based on the detection result of positions of a focus lens at respective times in the contrast AF, and an error occurs at the peak position if a position of the focus lens is not exactly detected, which deteriorates focusing accuracy.

In a mechanical configuration or an optical configuration of a lens for the phase difference AF in which a motor that drives a focus lens is mounted, a position of the focus lens is generally detected using a sensor that is at a position closest to the motor to detect a rotation angle of the motor.

With respect to lenses with this configuration, however, mechanical rattling occurring between the focus lens and the sensor for detecting a position of the focus lens or the like is significant, and thus it is difficult to exactly detect a position of the focus lens. Thus, it is not possible to detect a proper peak position and thus to perform highly accurate focusing.

The present technology takes the above circumstances into consideration, and aims to perform highly accurate focusing.

According to a first embodiment of the present technology, an interchangeable lens includes: a lens position detection unit configured to detect a position of a lens; a motor configured to move a movable lens frame to which the lens is fixed; a driving state detection unit configured to detect a driving state of the motor; and a control unit configured to decide a driving speed of the motor based on a difference between a target speed, which is based on a difference between a target position of the lens acquired from an imaging device and the position of the lens detected by the lens position detection unit, and a speed according to the driving state detected by the driving state detection unit.

The target position may be a position decided according to a position of the lens detected by the lens position detection unit.

The target position may be a position decided using contrast autofocus.

The driving state may be a rotation angle of the motor.

The motor may be a ring-shaped ultrasonic motor.

The driving state may be a rotation angle of a shaft of the motor.

The motor may be a DC motor.

The lens may be a focus lens.

The interchangeable lens may further includes a second focus lens with a higher f-number than the focus lens serving as a first focus lens. The lens position detection unit may detect a position of the first focus lens.

The lens position detection unit may be disposed at a position inside of a lens barrel at which a position of the lens can be detected regardless of a position of the movable lens frame that can move with respect to the lens barrel within a movable range of the movable lens frame.

The control unit may cause the motor to be operated at a constant driving speed at a search start time in the contrast autofocus, and stop driving of the motor before the lens arrives at the target position.

The interchangeable lens may further include a driving system configured to transmit driving of the motor to the movable lens frame. After a stop of driving of the motor, the movable lens frame may stop due to friction of the driving system.

The control unit may gradually lower the driving speed of the motor according to a speed curve decided based on a relation between a position of the lens before a movement and the target position.

The control unit may decide the speed curve according to information of an operation mode of autofocus acquired from the imaging device.

According to the first embodiment of the present technology, a driving method of an interchangeable lens mounted on an imaging device, includes: detecting a position of a lens by a lens position detection unit; detecting a driving state of a motor that moves a movable lens frame to which the lens is fixed by a driving state detection unit; and deciding a driving speed of the motor based on a difference between a target speed, which is based on a difference between a target position of the lens acquired from the imaging device and a position of the lens detected by the lens position detection unit, and a speed according to the driving state detected by the driving state detection unit.

According to the first embodiment of the present technology, a position of a lens is detected by a lens position detection unit, a driving state of a motor that moves a movable lens frame to which the lens is fixed is detected by a driving state detection unit, and a driving speed of the motor is decided based on a difference between a target speed, which is based on a difference between a target position of the lens acquired from the imaging device and a position of the lens detected by the lens position detection unit, and a speed according to the driving state detected by the driving state detection unit.

According to a second embodiment of the present technology, an electronic apparatus includes: a lens position detection unit configured to detect a position of a lens; a motor configured to move a movable lens frame to which the lens is fixed; a driving state detection unit configured to detect a driving state of the motor; and a control unit configured to decide a driving speed of the motor based on a difference between a target speed, which is based on a difference between a target position of the lens acquired from an imaging device and a position of the lens detected by the lens position detection unit, and a speed according to the driving state detected by the driving state detection unit.

According to the second embodiment of the present technology, a lens position detection unit detects a position of a lens; a motor moves a movable lens frame to which the lens is fixed; a driving state detection unit detects a driving state of the motor; and a driving speed of the motor is decided based on a difference between a target speed, which is based on a difference between a target position of the lens acquired from an imaging device and a position of the lens detected by the lens position detection unit, and a speed according to the driving state detected by the driving state detection unit.

According to the first and second embodiments of the present technology, it is possible to perform highly accurate focusing.

It should be noted that the advantageous effects of embodiments of the present technology are not limited to the advantageous effects described herein, and may include any advantageous effect described in the present disclosure.

DETAILED DESCRIPTION OF THE EMBODIMENT(S)

Embodiments to which the present technology is applied will be described with reference to the drawings.

First Embodiment

<Configuration Example of an Imaging System>

An embodiment of the present technology relates to an interchangeable lens that controls focusing using focus lenses by controlling driving of a motor with a speed servo, and various kinds of electronic apparatuses having an imaging function such as cameras.

Figure 1:
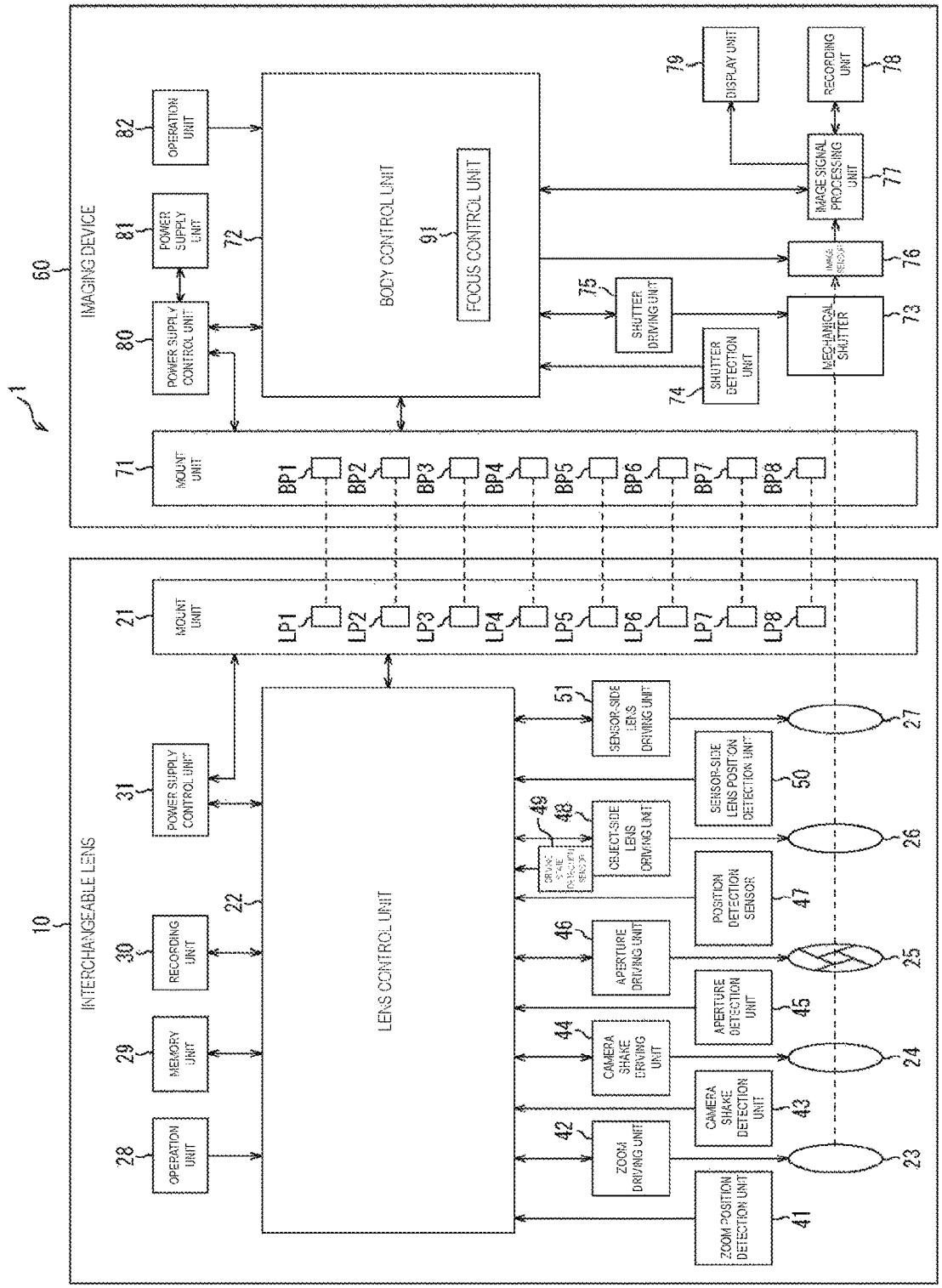
FIG. 1 is a diagram showing a configuration example of an imaging system.

FIG. 1 is a block diagram showing a configuration example of an embodiment of an imaging system to which an embodiment of the present technology is applied.

The imaging system 1 of FIG. 1 is an interchangeable lens-type digital camera, and includes an interchangeable lens 10 and an imaging device 60 on a body side.

The interchangeable lens 10 has a mount unit 21 that is detachably mounted on a mount unit 71 of the imaging device 60. The mount unit 21 has 8 terminals LP1 to LP8 that electrically connect the lens with the imaging device 60.

In addition, the interchangeable lens 10 includes a lens control unit 22, a zoom lens 23, a camera shake correction lens 24, an aperture 25, an object-side focus lens 26, a sensor-side focus lens 27, an operation unit 28, a memory unit 29, a recording unit 30, and a power supply control unit 31.

Note that, when it is not necessary to distinguish the terminals LP1 to LP8, a terminal will hereinafter be referred to also a terminal LPx.

The interchangeable lens 10 has two kinds of focus lenses that are the object-side focus lens 26 and the sensor-side focus lens 27 for autofocus control.

The object-side focus lens 26 is a focus lens on the side close to an object lens (not illustrated), and is composed of one or a plurality of lenses. In addition, the sensor-side focus lens 27 is a focus lens on the side close to an image sensor 76 of the imaging device 60, and is composed of one or a plurality of lenses.

Here, the object-side focus lens 26 is formed as a lens that satisfies at least any of the following conditions, in comparison with the sensor-side focus lens 27, and the conditions are; (1) an opening is large, which means a f-number is low; (2) when the same glass material (an optical glass material) is used, the thickness in the optical axis direction is great, which means the optical path is long; (3) an external shape in the direction that is vertical to the optical axis (a lens diameter) is large; and (4) a weight is heavy.

More specifically, for example, the object-side focus lens 26 is formed as a heavy lens having a weight of 100 g or more and a f-number of 4.0 or lower. On the other hand, the sensor-side focus lens 27 is formed as a light lens having, for example, a weight of about 10 g and a f-number higher than 4.0. Note that the numerical values here are mere examples, and values are not limited thereto.

The lens control unit 22 is constituted by an arithmetic processing device, for example, a central processing unit (CPU) or a micro processing unit (MPU), a peripheral circuit, and the like, and reads and executes a predetermined control program recorded in the recording unit 30 to control the whole interchangeable lens 10.

For example, the lens control unit 22 controls positions of the zoom lens 23 according to an instruction from the imaging device 60 supplied via a predetermined communication terminal among the terminals LP1 to LP8 of the mount unit 21 or an instruction from the operation unit 28.

More specifically, the lens control unit 22 acquires a current position of the zoom lens 23 from a zoom position detection unit 41, decides a drive direction and a drive amount for moving the zoom lens 23 to a predetermined position based on the acquisition result, and outputs the decided drive direction and drive amount to a zoom drive unit 42 along with a movement command.

The zoom position detection unit 41 is constituted by, for example, a magnetic sensor (a magneto resistance (MR) sensor) or the like to detect a position of the zoom lens 23 and supplies the position to the lens control unit 22. The zoom driving unit 42 moves the zoom lens 23 along the optical axis in the instructed drive direction to the extent of the instructed amount of driving based on the movement command supplied from the lens control unit 22.

In addition, the lens control unit 22 controls the camera shake correction lens 24 to correct camera shakes. Specifically, the lens control unit 22 decides a drive direction and a drive amount of the camera shake correction lens 24 in the direction in which a camera shake amount is negated based on the camera shake amount detected by the camera shake detection unit 43, and outputs the decided drive direction and drive amount to a camera shake drive unit 44 along with the movement command.

The camera shake detection unit 43 is constituted by a gyro sensor, a triaxial acceleration sensor, and the like. The gyro sensor is used to detect a deviation in a direction corresponding to pitch or yaw as a correction direction of the camera shake correction lens 24, and the triaxial acceleration sensor is used to detect a deviation in directions of an X axis and a Y axis when the optical axis direction is set to a Z axis. The camera shake detection unit 43 may be either or both of a gyro sensor and a triaxial acceleration sensor.

The camera shake driving unit 44 moves the camera shake correction lens 24 to the extent of the instructed amount of driving in the instructed drive direction based on the movement command supplied from the lens control unit 22.

The lens control unit 22 controls (the opening diameter of) the aperture 25 according to an instruction from the imaging device 60 supplied via a predetermined communication terminal among the terminals LP1 to LP8 of the mount unit 21 or the like. Specifically, the lens control unit 22 acquires the opening diameter of the aperture 25 detected by an aperture detection unit 45, and commands an aperture drive unit 46 to have the f-number instructed by the imaging device 60 to drive the aperture 25. The aperture drive unit 46 drives the aperture 25 to have the opening diameter instructed by the lens control unit 22.

Furthermore, the lens control unit 22 controls the two kinds of focus lenses that are the object-side focus lens 26 and the sensor-side focus lens 27 based on target positions of the focus lenses supplied from the imaging device 60.

Specifically, the lens control unit 22 acquires not only a current position of the object-side focus lens 26 from a position detection sensor 47 but also a detection result of a driving state of an object-side lens driving unit 48 from a driving state detection sensor 49.

Then, the lens control unit 22 controls the object-side lens driving unit 48 based on the supplied target positions, the acquired position of the object-side focus lens 26, and the detection result of the driving state. The object-side lens driving unit 48 moves the object-side focus lens 26 in the optical axis direction according to the control of the lens control unit 22.

In the same manner, the lens control unit 22 acquires a current position of the sensor-side focus lens 27 from a sensor-side lens position detection unit 50, decides a drive direction and an amount of driving to move the sensor-side focus lens 27 to a predetermined position based on the acquisition result and the supplied target position, and then outputs the decided drive direction and amount of driving to a sensor-side lens driving unit 51 along with the movement command. The sensor-side lens driving unit 51 moves the sensor-side focus lens 27 along the optical axis in the instructed drive direction to the extent of the instructed amount of driving.

The position detection sensor 47 and the sensor-side lens position detection unit 50 can be constituted by, for example, a magnetic sensor, an array of photodiodes, a potentiometer, a reflective encoder, and the like.

For the object-side lens drive unit 48 and the sensor-side lens drive unit 51, for example, an ultrasonic motor, a direct current (DC) motor, a linear actuator, a stepping motor, a piezo element (piezoelectric element), or the like can be used; however, when a focus lens with a large lens diameter, a large lens thickness, and a heavy weight is to be driven, a DC motor or an ultrasonic motor is preferable.

Here, since the object-side focus lens 26 is a heavy lens, the object-side lens driving unit 48 may be constituted by, for example, an ultrasonic motor, a DC motor, or the like. Conversely, since the sensor-side focus lens 27 is a light lens, the sensor-side lens driving unit 51 may be constituted by, for example, a linear actuator, a stepping motor, a piezo element, or the like.

Note that the interchangeable lens 10 does not necessarily have to have two kinds of focus lenses, and either the object-side focus lens 26 or the sensor-side focus lens 27 may be omitted. In this case, the lens position detection unit and the lens drive unit that are necessary for controlling the omitted focus lens are also omitted.

The operation unit 28 corresponds to a zoom ring which manually sets a zoom magnification, a focus ring which manually sets a focus lens, or the like, and receives a manual operation of a user, and supplies an operation signal corresponding to the received operation to the lens control unit 22.

The memory unit 29 is a volatile recording medium, for example, a random access memory (RAM) or the like, and is used as a recording area of various kinds of data during an operation.

The recording unit 30 is a non-volatile recording medium, and a predetermined control program executed by the lens control unit 22 and various kinds of data such as parameters for adjustment are recorded.

The power supply control unit 31 acquires an amount of electricity of power supplied from the imaging device 60, and based on the acquired amount of electricity, power is supplied by optimally allotting the amount of electricity to units (the lens control unit 22 and various drive units) inside the interchangeable lens 10.

On the other hand, the imaging device 60 has the mount unit 71 in which the interchangeable lens 10 is detachably mounted. The mount unit 71 has 8 terminals BP1 to BP8 which electrically connect the device with the interchangeable lens 10. Note that, if is not necessary to distinguish the terminals BP1 to BP8, a terminal will hereinafter be referred to also as a terminal BPx.

When the interchangeable lens 10 is mounted on the mount unit 71 of the imaging device 60, the terminals BP1 to BP8 of the mount unit 71 are electrically and physically connected to the terminals LP1 to LP8 of the mount unit 21 of the interchangeable lens 10.

More specifically, the terminal BP1 is electrically and physically connected to the terminal LP1, the terminal BP2 is electrically and physically connected to the terminal LP2, and the terminal BP3 is electrically and physically connected to the terminal LP3 as shown in FIG. 1. The terminals BP4 to BP8 are also electrically and physically connected to the terminals LP4 to LP8 one-to-one. Terminal connection, however, is not limited thereto, and it is possible for some of the terminals not to be connected.

The imaging device 60 has a body control unit 72, a mechanical shutter 73, a shutter detection unit 74, a shutter drive unit 75, an image sensor 76, an image signal processing unit 77, a recording unit 78, a display unit 79, a power supply control unit 80, a power supply unit 81, and an operation unit 82.

The body control unit 72 is constituted by, for example, an arithmetic processing device such as a CPU or an MPU, a non-volatile memory, peripheral circuits, and the like, and reads and executes a predetermined control program recorded in the non-volatile memory to control the whole imaging system 1.

The body control unit 72 causes the image sensor 76 to perform predetermined imaging based on, for example, an operation signal indicating a user operation supplied from the operation unit 82, and transmits a predetermined command to the interchangeable lens 10 via the mount unit 71 to drive a focus lens (the object-side focus lens 26 or the sensor-side focus lens 27), the zoom lens 23, or the like.

In addition, for example, lens position information of a focus lens, zoom position information of the zoom lens 23, and the like are supplied from the interchangeable lens 10 to the body control unit 72 via the mount unit 71, and the body control unit 72 causes the image sensor 76 to perform imaging of an image to be recorded in a recording unit 78 at an optimum timing based on the information. An image (data thereof) obtained by the image sensor 76 is recorded (stored) in the recording unit 78 or displayed on the display unit 79 according to control of the body control unit 72.

The body control unit 72 has a focus control unit 91, and the focus control unit 91 controls focusing in the contrast AF based on the information supplied from the interchangeable lens 10 or an image supplied from the image signal processing unit 77.

The mechanical shutter 73 is disposed in the front of the image sensor 76, and is opened or closed to receive or block light that passes through the optical system of the interchangeable lens 10 according to control of the shutter driving unit 75. The shutter detection unit 74 detects an open or closed state of the mechanical shutter 73, and supplies the information to the body control unit 72. The shutter driving unit 75 drives the mechanical shutter 73 to be in an open or closed state based on control of the body control unit 72.

The image sensor 76 is configured as a charge coupled device (CCD) or a complementary metal oxide semiconductor (CMOS) sensor. The image sensor 76 images a subject by photoelectrically converting light incident via the zoom lens 23 to the mechanical shutter 73, and supplies image data of an image obtained as a result of the imaging to the image signal processing unit 77.

Note that, when the image sensor 76 is configured of a CCD sensor or a CMOS sensor, an electronic shutter can be used, and thus the mechanical shutter 73 can be omitted. When the mechanical shutter 73 is omitted, the shutter detection unit 74 and the shutter drive unit 75 that are used for controlling the shutter are omitted as well.

The image signal processing unit 77 executes predetermined image signal processing on the image supplied from the image sensor 76.

For example, the image signal processing unit 77 converts a raw image supplied from the image sensor 76 into image data of a predetermined file format, and records the result in the recording unit 78. In addition, the image signal processing unit 77 executes mosaicing on the raw image, and further performs reversible compression or irreversible compression to convert the image into image data of a predetermined file format, and records the data in the recording unit 78. In addition, for example, the image signal processing unit 77 converts image data supplied from the image sensor 76 into an image signal of a predetermined display format, and supplies the signal to the display unit 79 to cause a captured image to be displayed thereon.

The recording unit 78 is configured of, for example, a non-volatile memory, and records image data captured by the image sensor 76 and the like. A recording medium that serves as the recording unit 78 may be detachable.

The display unit 79 is configured of a panel-type display device such as a liquid crystal panel or an organic electro luminescence (EL) panel, and displays images (dynamic images or still images) supplied from the image signal processing unit 77. The display unit 79 is installed on the back side that is opposed to the front side on which the mount unit 71 is disposed to be capable of performing display of through images, display of preview images, and the like.

The power supply control unit 80 computes an amount of electric power that can be supplied to the interchangeable lens 10 taking an operation state of the imaging device 60 into account, and then supplies power to the interchangeable lens 10 via the mount unit 71. The power supply unit 81 is constituted by, for example, a secondary battery such as a NiCd battery, a NiMH battery, or a Li battery, an AC adaptor, and the like.

The operation unit 82 includes a software key realized by a touch panel that is laminated on the display unit 79 and hardware keys such as a release button, a zoom button, and a mode switching button to receive predetermined operations performed by a user and supply operation signals thereof to the body control unit 72. Operating the operation unit 82, the user can perform, for example, setting of a photographing mode, setting of an AF mode, setting of a camera parameter, and the like.

The interchangeable lens 10 and the imaging device 60 that constitute the imaging system 1 are configured as described above.

Note that, when the interchangeable lens 10 is mounted on the imaging device 60, it is assumed that the mounting style of the mount unit 71 of the imaging device 60 is the same as that of the mount unit 21 of the interchangeable lens 10; however, when the mounting styles are different from each other, a mount adaptor that converts mounting styles is inserted between the imaging device 60 and the interchangeable lens 10.

<Mount Adaptor>

Figure 2:
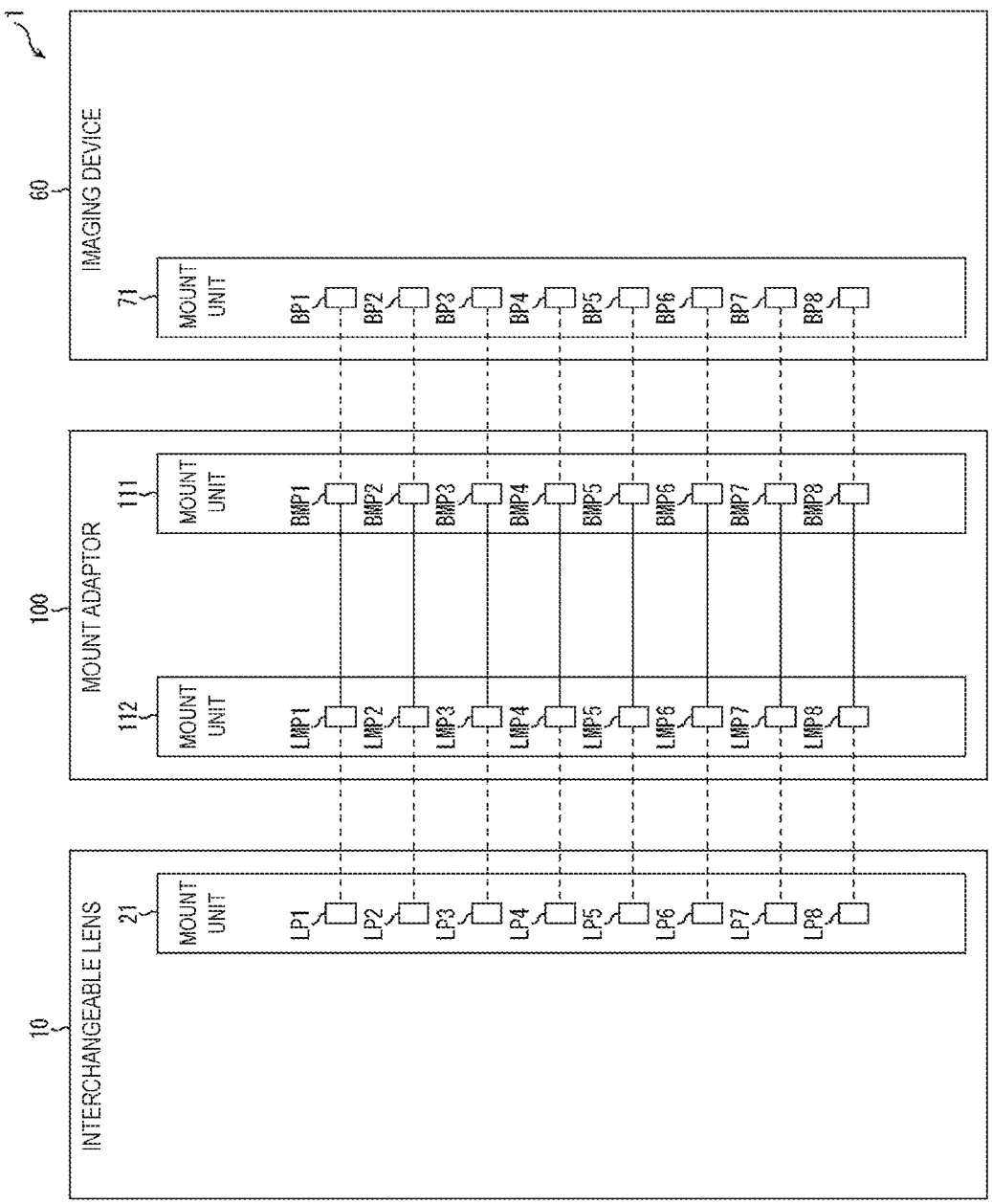
FIG. 2 is a diagram showing a configuration example of the imaging system when a mount adaptor is used.

FIG. 2 is a block diagram showing a configuration example of the imaging system when a mount adaptor is used.

Note that, due to the limited space, the units of the interchangeable lens 10 and the imaging device 60 except for the mount unit 21 and the mount unit 71 are omitted in FIG. 2.

The mount adaptor 100 has a mount unit 111 that is mounted on the mount unit 71 of the imaging device 60 and another mount unit 112 that is mounted on the mount unit 21 of the interchangeable lens 10. The mount style of the mount unit 111 is the same as that of the mount unit 71 of the imaging device 60, the mount style of the mount unit 112 is the same as the mount unit 21 of the interchangeable lens 10, and the mount style of the mount unit 111 at the side of the imaging device 60 is different from the mount style of the mount unit 112 at the side of the interchangeable lens 10.

The mount unit 111 at the side of the imaging device 60 has terminals BMP1 to BMP8, and the terminals BMP1 to BMP8 are electrically and physically connected to the terminals BP1 to BP8 of the mount unit 71 of the imaging device 60 one-to-one.

On the other hand, the mount unit 112 at the side of the interchangeable lens 10 has terminals LMP1 to LMP8, and the terminals LMP1 to LMP8 are electrically and physically connected to the terminals LP1 to LP8 of the mount unit 21 of the interchangeable lens 10 one-to-one.

In the inside of the mount adaptor 100, the terminals BMP1 to BMP8 of the mount unit 111 are electrically and physically connected to the terminals LMP1 to LMP8 of the mount unit 112 one-to-one.

When the mounting style of the mount unit 71 of the imaging device 60 is different from that of the mount unit 21 of the interchangeable lens 10, the mount adaptor 100 is inserted therebetween so that the interchangeable lens 10 having the different mounting style can be mounted on the imaging device 60. However, when the mount adaptor 100 is interposed therebetween, it is also possible for some of the terminals not to be connected.

In addition, when the mounting styles of the imaging device 60 and the interchangeable lens 10 are the same, a teleconverter or the like may be mounted instead of the mount adaptor 100. Hereinbelow, for the sake of simplified description, description will be continued on the assumption that the interchangeable lens 10 is directly mounted on the imaging device 60, rather than mounting the mount adaptor 100 or the like between the imaging device 60 and the interchangeable lens 10.

<Regarding an Error of a Peak Position>

When focus control is performed in the imaging system 1 using the contrast AF, contrast evaluation values are computed based on images captured when the object-side focus lens 26 is at respective positions. Then, based on the contrast evaluation values, a position of the object-side focus lens 26 at which contrast is presumed to be the maximum is detected as a peak position. Note that, more specifically, the focus control unit 91 regards the two focus lens groups that are originally composed of the object-side focus lens 26 and the sensor-side focus lens 27 as one focus lens group, and detects a peak position of the one focus lens group. However, in order to simplify description in FIG. 3, the description will be provided on the assumption that the focus lens of the interchangeable lens 10 includes only the object-side focus lens 26.

If a position of the object-side focus lens 26 is not exactly detected each time when a peak position is detected, an error occurs in the detection result of the peak position accordingly.

Figure 3:
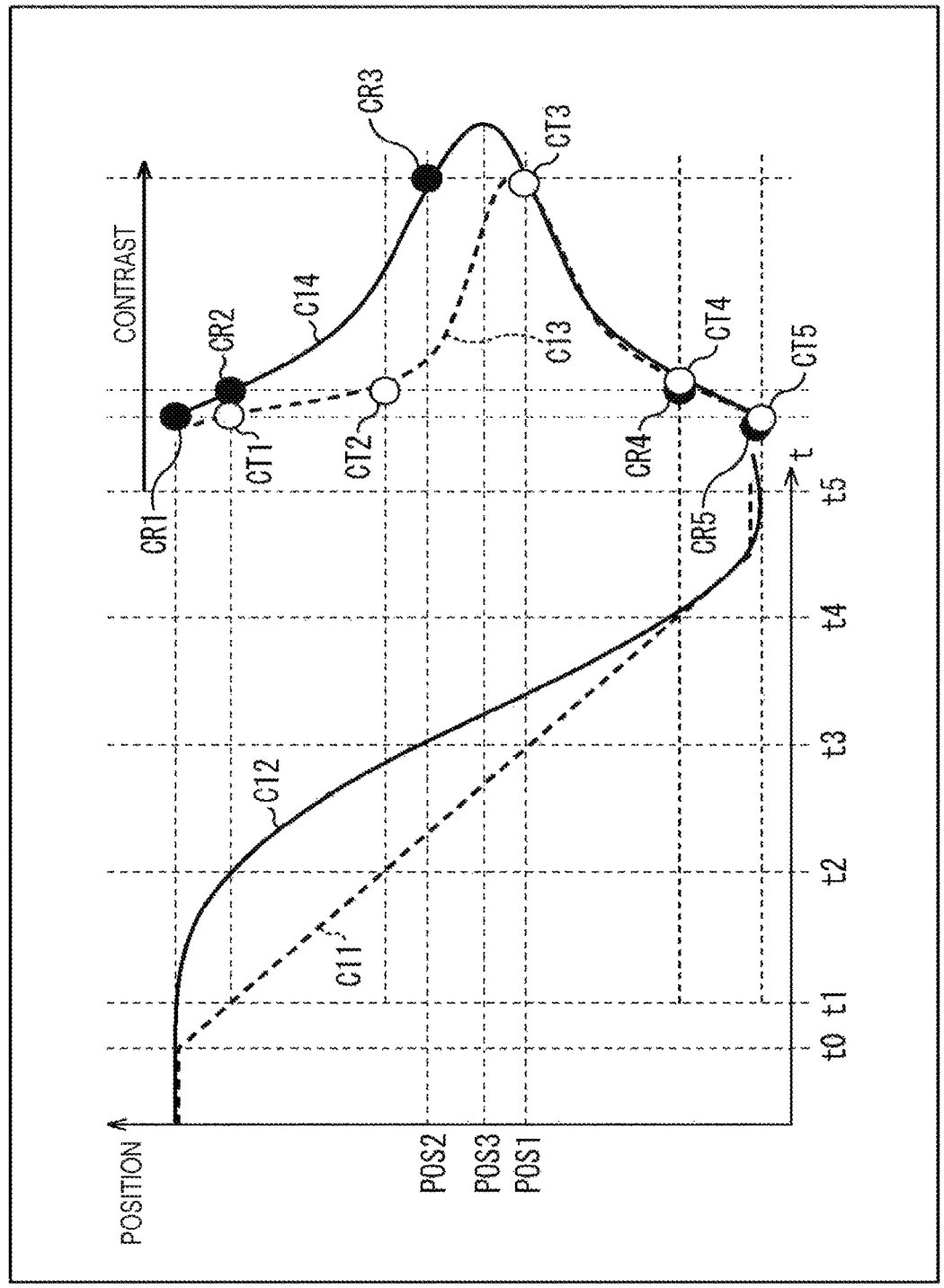
FIG. 3 is a diagram for describing an error of a peak position.

It is assumed that, for example, contrast evaluation values of images obtained by imaging a subject at respective positions while the object-side focus lens 26 is moved are calculated as shown in FIG. 3. Note that the vertical axis represents positions of the object-side focus lens 26, and the horizontal axis represents time in FIG. 3.

It is assumed that, for example, as a result of performing a search operation using the contrast AF in the period from a time t0 to a time t5 and detecting positions of the object-side focus lens 26 at the respective times in the search period, the result indicated by a polygonal line C11 is obtained.

Here, a search based on the contrast AF is an operation of specifying a detection range (a search range) in which a focus lens is moved and then obtaining a contrast evaluation value using a plurality of detection values that are obtained at each of a plurality of detection positions specified within the specified detection range. For example, a detection position can be specified in the unit of a depth of field or a depth of focus.

In this example, the period from the time t0 at which a constant speed operation of the object-side focus lens 26 starts to the time t5 at which the object-side focus lens 26 completely stops is set as a search period, and positions of the object-side focus lens 26 at respective times in the search period are detected. For example, a position POS1 is detected as a position of the object-side focus lens 26 at a time t3 in this example.

However, it is assumed that there is an error in a detected position of the object-side focus lens 26 and an actual trajectory of positions of the object-side focus lens 26 is as indicated by a curve C12. In this example, although the position of the object-side focus lens 26 at the time t3 is detected as the position POS1, for example, the actual position of the object-side focus lens 26 is a position POS2.

If there are discrepancies between the polygonal line C11 indicating detected positions of the object-side focus lens 26 and the curve C12 indicating actual positions of the object-side focus lens 26, a discrepancy also occurs in the detection result of a peak position.

In other words, the imaging system 1 detects the peak position from the detection result of the positions of the object-side focus lens 26 at the respective times as indicated by the polygonal line C11 and images captured at the respective times.

Specifically, contrast of the captured images is computed and contrast evaluation values indicating the contrast are calculated based on the captured images. Here, it is assumed that as contrast becomes higher, i.e., as the degree of focusing of the object-side focus lens 26 becomes higher, a contrast evaluation value increases.

It is assumed that, for example, images are captured at the respective times from the time t1 to the time t5, and the detection result indicated by the curve C13 is obtained from the contrast evaluation values at the times and the positions of the object-side focus lens 26 indicated by the polygonal line C11.

Note that a curve C13 and a curve C14 indicate contrast, i.e., contrast evaluation values at the respective positions of the object-side focus lens 26, and, with respect to the curves, the vertical axis represents positions of the object-side focus lens 26 and the horizontal axis represents degrees of contrast. In particular, here, the degrees of contrast, i.e., contrast evaluation values, are indicated to become higher toward the right in the drawing.

For example, the curve C13 indicates changes in contrast evaluation values with respect to a change in positions of the object-side focus lens 26 that are computed based on the detection result of the positions of the object-side focus lens 26 indicated by the polygonal line C11. Here, points CT1 to CT5 on the curve C13 each indicate contrast evaluation values at the positions of the object-side focus lens 26 at the time t1 to the time t5.

The imaging system 1 obtains the curve C13 indicating the contrast evaluation values of the consecutive positions of the object-side focus lens 26 as detection results by performing interpolation or the like at the points CT1 to CT5.

In this example, the position on the curve C13 with the highest contrast is the position POS1 of the object-side focus lens 26, and thus this position POS1 is detected as a peak position. Therefore, in this case, if the object-side focus lens 26 is moved to the position POS1, the focus is presumed to be on a subject.

However, positions of the object-side focus lens 26 at respective times are the positions indicated by the curve C12 in practice as described above.

Therefore, the original detection result that should be obtained by computing the positions indicated by the curve C12 and the contrast evaluation values at the respective times is obtained as indicated by the curve C14. Here, each of a point CR1 to a point CR5 on the curve C14 indicates one of the contrast evaluation values at the actual positions of the object-side focus lens 26 at the time t1 to the time t5.

Originally, each of a point CT1 to a point CT5 should be the same position as the point CR1 to the point CR5, but because there is an error in detection of the positions of the object-side focus lens 26, an error occurs in the positions of these points as well.

Thus, when a peak position is detected from the detection result indicated by the curve C14, the peak position is the position POS3, and therefore this position POS3 is the peak position that should be actually detected; however, there is an error between the position POS3 and the position POS1 detected by the imaging system 1.

In this case, the focus is accurate to some degree even when the object-side focus lens 26 is moved to the position POS1, but the degree of focusing becomes lower than when the object-side focus lens 26 is moved to the position POS3.

The occurrence of an error in detecting the peak position as described above is attributable to the configuration of a general imaging system in which an output of a sensor for detecting a rotation speed of a motor that is provided near the motor that drives the object-side focus lens is also used to detect a position of the object-side focus lens. This is because mechanical rattling occurring between the object-side focus lens and the sensor or the like is considerable, and it is not possible to detect a position of the object-side focus lens with high accuracy from the output of the sensor that is near the motor.

<Regarding the Position Detection Sensor>

Therefore, the present technology enables focusing with higher accuracy by providing the position detection sensor 47 that detects a position of the object-side focus lens 26 at a position closest to the object-side focus lens 26. Note that the same reference numerals are given to elements of FIG. 4 that correspond to those of FIG. 1, and description thereof is appropriately omitted.

Figure 4:
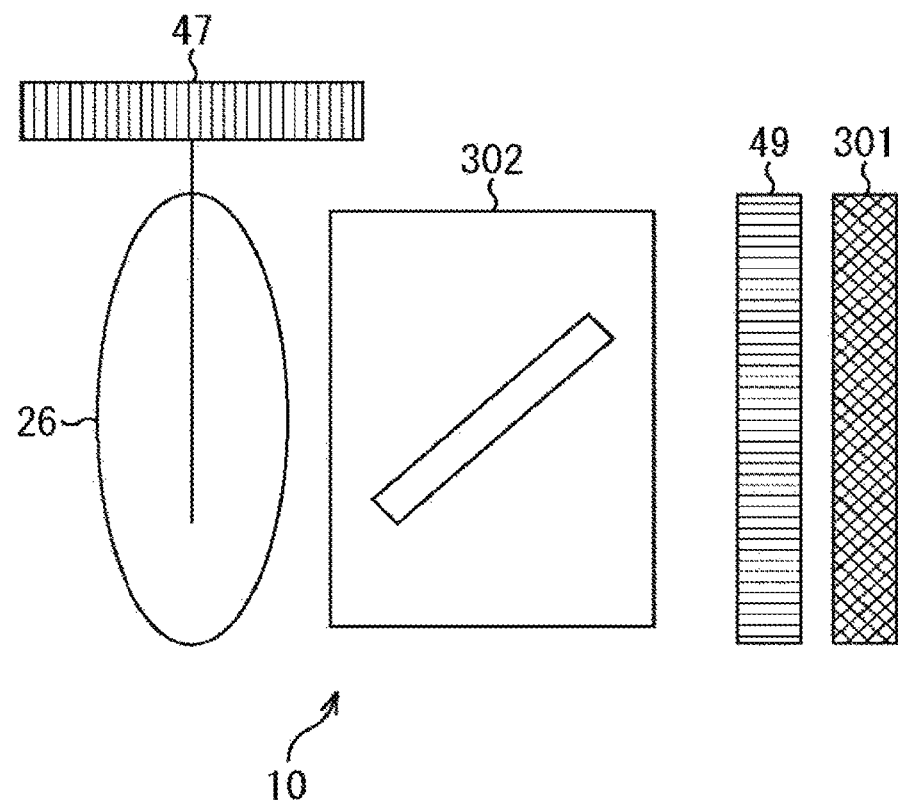
FIG. 4 is a diagram for describing a position detection sensor that detects a position of a focus lens.

In the example shown in FIG. 4, the position detection sensor 47 is provided near the object-side focus lens 26 in the interchangeable lens 10.

In addition, the object-side focus lens 26 is moved by a motor 301. In other words, when the motor 301 performs driving, a transmission mechanism 302 that is a driving system such as a cam ring connected to the motor 301 is driven, and the object-side focus lens 26 is moved according to the driving of the transmission mechanism 302. In this example, the transmission mechanism 302 moves linearly the object-side focus lens 26 in the horizontal direction of the drawing. In other words, the object-side focus lens 26 is driven in a linear motion in the optical axis direction. In addition, the transmission mechanism 302 has not only the driving system such as the cam ring but also a speed reducer such as a gear train.

Furthermore, the driving state detection sensor 49 for detecting a driving state of the motor 301 such as a rotation angle of the motor 301 is provided at a position closest to the motor 301.

Here, the position detection sensor 47 is composed of, for example, an optical encoder, a giant magneto resistive (GRM) effect sensor, an array of photodiodes, a potentiometer, a magnetic sensor, and the like, and is provided near the object-side focus lens 26.

Note that the position detection sensor 47 is provided at a position closer to the object-side focus lens 26 than the driving state detection sensor 49 is, and may be provided at any position as long as an actual position of the object-side focus lens 26 can be detected with sufficient accuracy therefrom. However, it is preferable that the position at which the position detection sensor 47 is provided be as close to the object-side focus lens 26 as possible.

The position detection sensor 47 detects an actual position of the object-side focus lens 26 in the optical axis direction of the object-side focus lens 26, more specifically, an actual position of the lens center of the object-side focus lens 26, and outputs the detection result.

By providing such a sensor dedicated to detecting a position of the object-side focus lens 26 in the vicinity of the object-side focus lens 26 as described above, an actual position of the object-side focus lens 26 can be detected more exactly, i.e., with higher precision without being affected by rattling of the transmission mechanism 302 or the like. Accordingly, more exact control of a position of the object-side focus lens 26 can be realized, and focusing accuracy of the object-side focus lens 26 can be improved.

In addition, the motor 301 is any of various kinds of motors that can drive the object-side focus lens 26, for example, a ring-shaped ultrasonic motor, a DC motor, or the like.

Particularly, since the object-side focus lens 26 is much heavier than the sensor-side focus lens 27, a motor having great driving force such as a ring-shaped ultrasonic motor or a DC motor is proper for moving such an object-side focus lens 26.

Generally, it is difficult to directly drive a heavy lens like the object-side focus lens 26. For this reason, the transmission mechanism 302 that has a speed reducer such as a gear train is provided between the object-side focus lens 26 and the motor 301, and positioning of the object-side focus lens 26 is performed.

In a ring-shaped ultrasonic motor that is an example of the motor 301, for example, friction between a rotor and a stator constituting the ultrasonic motor is greater than friction of a movement mechanism unit of the cam ring serving as the transmission mechanism 302. Likewise, in a DC motor that is another example of the motor 301, friction of a gear train constituting the DC motor is greater than friction of the movement mechanism unit of the cam ring as the transmission mechanism 302.

On the other hand, because the light sensor-side focus lens 27 can be directly driven without a speed reducer being provided, a linear actuator, a stepping motor, a piezo element, or the like is used as the sensor-side lens driving unit 51.

The driving state detection sensor 49 is configured as a sensor, for example, a magnetic sensor, a photo interrupter (PI) sensor, or the like.

More specifically, when the motor 301 is configured as a ring-shaped ultrasonic motor, for example, the driving state detection sensor 49 may be configured as a magnetic sensor. In this case, an output of the driving state detection sensor 49 is a rotation angle of the ultrasonic motor serving as the motor 301.

In addition, when the motor 301 is configured as a DC motor, for example, the driving state detection sensor 49 may be configured as a PI sensor. In this case, an output of the driving state detection sensor 49 is a rotation angle of a shaft of the DC motor serving as the motor 301.

The optical system constituting the interchangeable lens 10 can have, for example, the configuration shown in FIG.

5. Note that the same reference numerals are given to the elements in FIG. 5 that correspond to those in FIG. 1, and description thereof is omitted.

Figure 5:
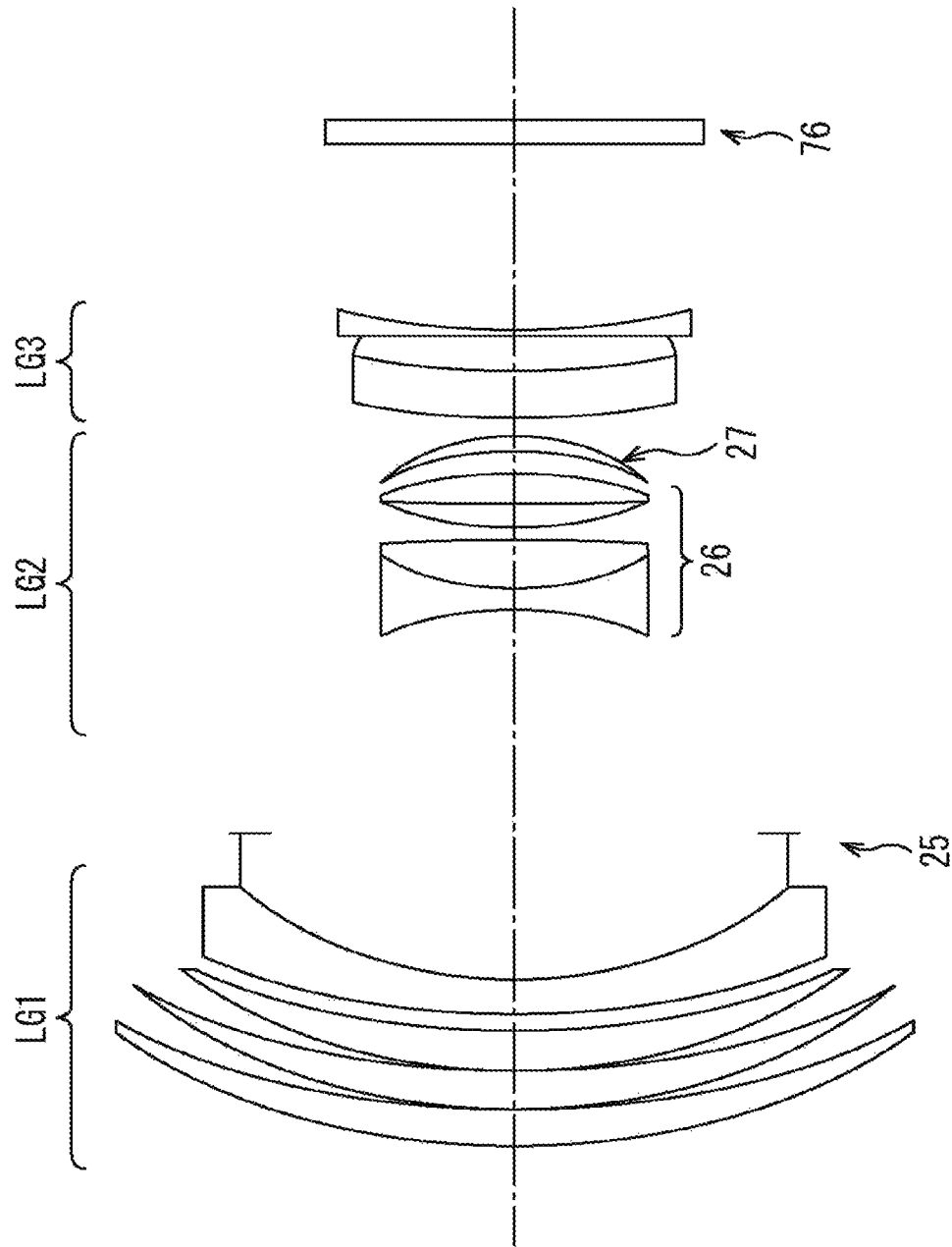
FIG. 5 is a diagram showing a configuration example of an optical system.

In the example shown in FIG. 5, the optical system constituting the interchangeable lens 10 has a first lens group LG1, a second lens group LG2, and a third lens group LG3. Here, the lenses constituting the first lens group LG1 at the leftmost position in the drawing are lenses closest to the object side, and thus are called object lenses. In addition, the third lens group LG3 is a lens group disposed closest to the image sensor 76 side.

Here, the first lens group LG1 and the third lens group LG3 are fixed to a fixed lens barrel that is not illustrated, and thus the positional relation of the first lens group LG1 and the third lens group LG3 with the image sensor 76 does not change.

On the other hand, the second lens group LG2 is set to be movable with respect to the fixed lens barrel. Specifically, the second lens group LG2 includes the object-side focus lens 26 on the object side and the sensor-side focus lens 27 on the image sensor 76 side, and the object-side focus lens 26 and the sensor-side focus lens 27 are set to be independently movable.

Furthermore, more specifically, the object-side focus lens 26 is provided in the fixed lens barrel constituting the interchangeable lens 10.

Figure 6:
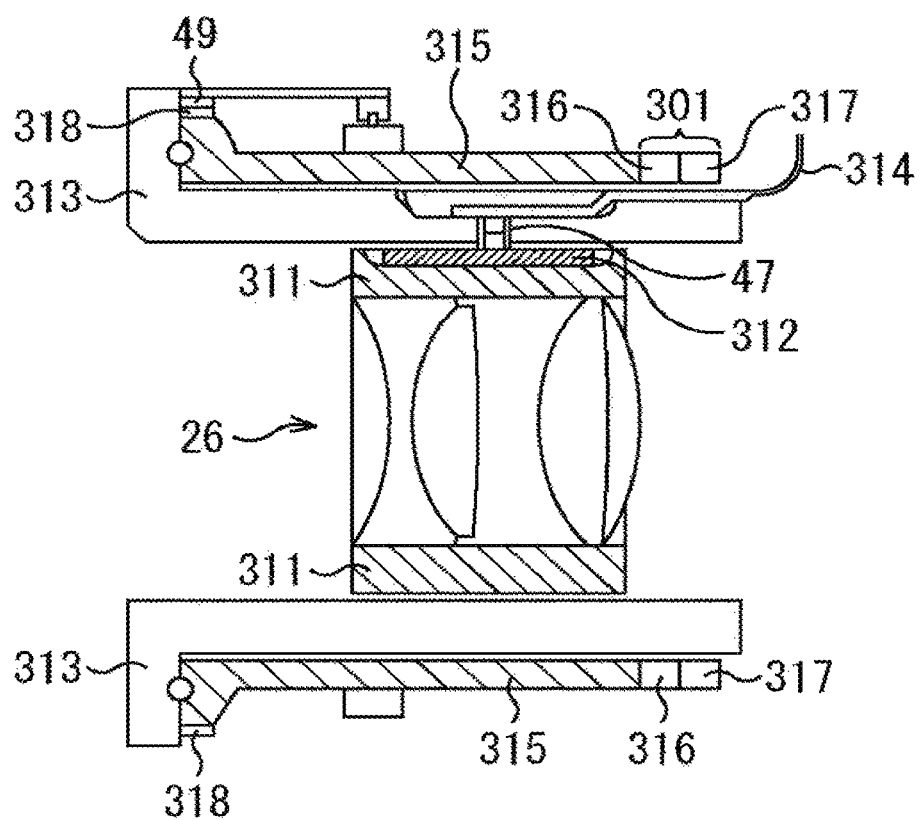
FIG. 6 is a diagram for describing a disposition position of a position detection sensor.
Figure 7:
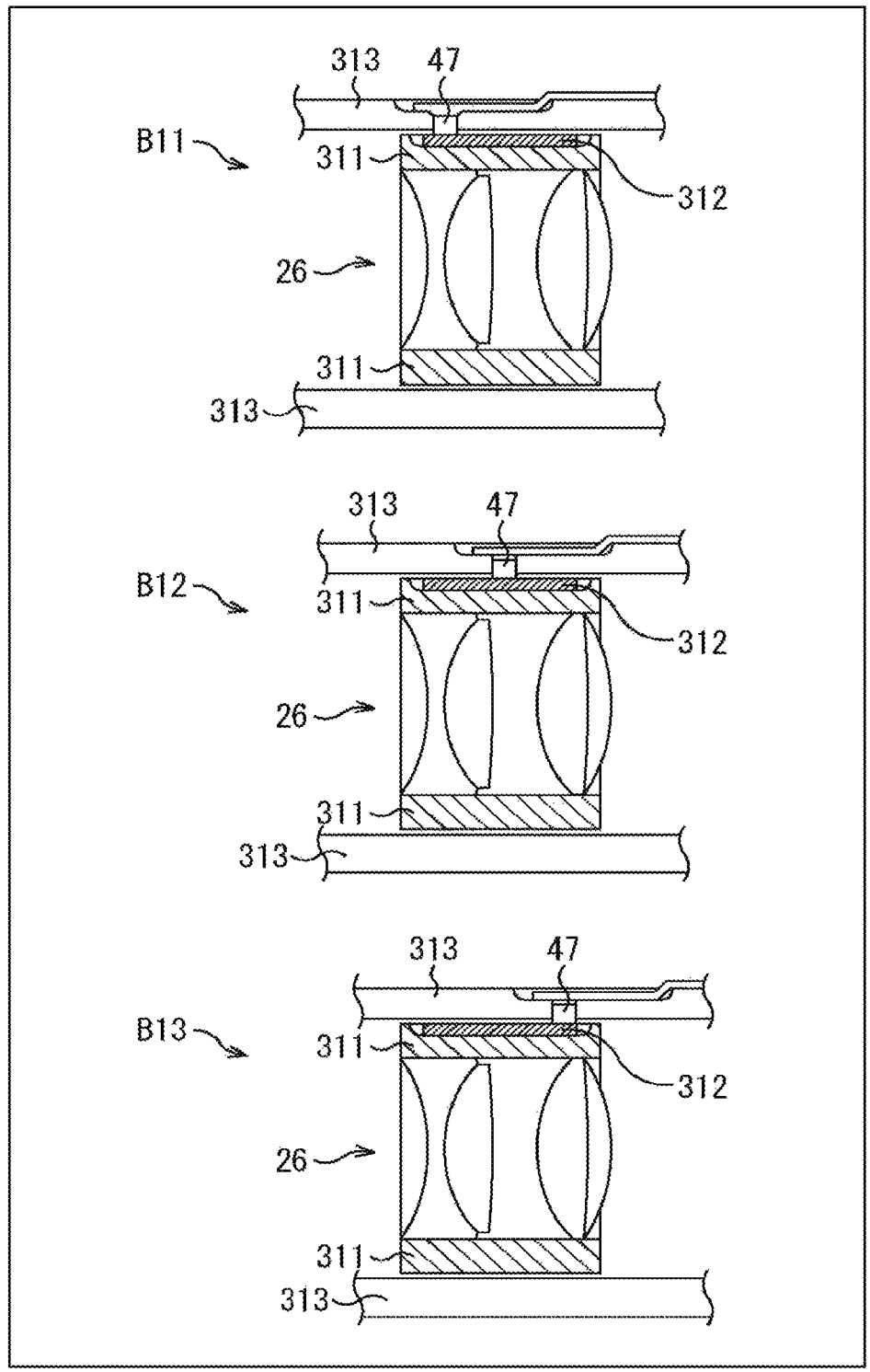
FIG. 7 is a diagram for describing a disposition position of a position detection sensor.

For example, when the motor 301 is configured as a ring-shaped ultrasonic motor and the position detection sensor 47 and the driving state detection sensor 49 are configured as magnetic sensors, the object-side focus lens 26 is moved as shown in FIGS. 6 and 7, and the position detection sensor 47 is disposed on an inner wall of the fixed lens barrel. Note that the same reference numerals are given to the elements in FIGS. 6 and 7 that correspond to those of FIG. 4, and description thereof will be appropriately omitted.

FIGS. 6 and 7 show cross-sectional diagrams of a part in the vicinity of the object-side focus lens 26 constituting the interchangeable lens 10, and in FIGS. 6 and 7, the left sides of the drawings represent the object lens side and the right sides thereof represent the image sensor 76 side.

In the example shown in FIG. 6, the object-side focus lens 26 is constituted by a plurality of lenses, and the object-side focus lens 26 is fixed to the inside of a tubular movable lens frame 311. In other words, the movable lens frame 311 holds the lens group constituting the object-side focus lens 26.

In addition, the movable lens frame 311 is provided with magnets 312 for a magnetic sensor whose S poles and N poles are arranged in an alternating manner at equal intervals in the optical axis direction of the object-side focus lens 26.

The movable lens frame 311 is fitted into the tubular fixed lens barrel 313, and the movable lens frame 311 is set to be movable inside the fixed lens barrel 313 in the optical axis direction of the object-side focus lens 26. In other words, the movable lens frame 311 is set to be movable with respect to the fixed lens barrel 313 that is fixed in an interchangeable lens housing that is not illustrated. In addition, the magnets 312 provided in the movable lens frame 311 are fixed to face an inner wall of the fixed lens barrel 313.

Furthermore, the fixed lens barrel 313 is provided with an opening, and a magnetic sensor serving as the position detection sensor 47, more specifically, the head of the magnetic sensor, is fitted into the opening. Accordingly, the magnetic sensor serving as the position detection sensor 47 is fixed to be positioned on an inner wall side of the fixed lens barrel 313, i.e., to be positioned inside the fixed lens barrel 313. In addition, a flexible wire 314 is connected to the magnetic sensor.

Since the position detection sensor 47 is provided on the inner wall side of the fixed lens barrel 313 as described above, the position detection sensor 47 is set to face the magnets 312 that are fixed to the movable lens frame 311 at all times, regardless of a position of the movable lens frame 311.

According to a movement of the movable lens frame 311, the area of the magnets 312 facing the position detection sensor 47 alternately changes from one of an S pole and an N pole to the other. The position detection sensor 47 outputs a pulse according to the change as a detection result of the position of the movable lens frame 311, i.e., the object-side focus lens 26 fixed to the movable lens frame 311.

Note that, although the example in which the position detection sensor 47 is fitted into the opening of the fixed lens barrel 313 has been described here, the position detection sensor 47 may be disposed on an inner wall side of the fixed lens barrel 313 such that a recess is provided on an inner wall of the fixed lens barrel 313 and the position detection sensor 47 is fixed into the recess.

In addition, a cam ring 315 constituting the transmission mechanism 302 is provided on an outer wall side of the fixed lens barrel 313, and the ring-shaped ultrasonic motor serving as the motor 301 is provided adjacent to the cam ring 315 along the outer wall of the fixed lens barrel 313.

In this example, the ring-shaped ultrasonic motor serving as the motor 301 has a rotor 316 connected to the cam ring 315 and a stator 317 provided adjacent to the rotor 316. Here, the stator 317 is fixed to the fixed lens barrel 313, and the rotor 316 rotates with respect to the stator 317 using the optical axis of the object-side focus lens 26 as a rotation axis.

When the rotor 316 rotates as described above, driving of the rotor 316 is transmitted to the cam ring 315, and as a result, the cam ring 315 also rotates using the optical axis of the object-side focus lens 26 as a rotation axis. Then, the movable lens frame 311 moves in the optical axis direction of the object-side focus lens 26 according to the rotation of the cam ring 315. In other words, the driving of the rotor 316 is transmitted to the movable lens frame 311 via the cam ring 315.

Furthermore, a sensing sheet 318 composed of magnets for a magnetic sensor whose S poles and N poles are arranged at equal intervals in an alternating manner is attached onto a surface of the cam ring 315 to surround the cam ring 315. In other words, a linear pattern including the S poles and the N poles at the equal intervals is formed on the sensing sheet 318.

In addition, a magnetic sensor serving as the driving state detection sensor 49 that is fixed to the fixed lens barrel 313, more specifically, the head of the magnetic sensor, is provided in a part facing the sensing sheet 318.

Like the case of the magnets 312, when the cam ring 315 rotates, the sensing sheet 318 attached to the cam ring 315 also rotates according to the rotation, and thus the region of the sensing sheet 318 facing the driving state detection sensor 49 alternately changes from one of an S pole or an N pole to the other. The driving state detection sensor 49 outputs a pulse according to the change as a driving state of the motor 301 connected to the cam ring 315, i.e., a detection result of a rotation angle.

In addition, due to the driving of the motor 301, the movable lens frame 311 and the object-side focus lens 26 fixed to the movable lens frame 311 move in the optical axis direction as an integrated body.

At this time, regardless of a position within the movable range of the movable lens frame 311 to which the movable lens frame 311 is moved, a disposition position of the position detection sensor 47 is decided such that the position detection sensor 47 can detect a position of the object-side focus lens 26.

Specifically, the state indicated by the arrow B11 of FIG. 7, for example, shows a state in which the movable lens frame 311 is moved closest to the image sensor 76 side, i.e., the movable lens frame 311 arrives at an end of its movable range on the image sensor 76 side. It is understood that, in this state, the left end of the magnets 312 provided in the movable lens frame 311 in the drawing faces the position detection sensor 47 and thus the position detection sensor 47 can detect a position of the object-side focus lens 26.

In addition, the state indicated by the arrow B12 shows a state in which the movable lens frame 311 is at the center of the movable range. It is understood that, in this state, the center of the magnets 312 provided on the movable lens frame 311 faces the position detection sensor 47 and thus the position detection sensor 47 can detect a position of the object-side focus lens 26.

Furthermore, the state indicated by the arrow B13 shows a state in which the movable lens frame 311 is moved closest to the object lens side, i.e., the movable lens frame 311 arrives at the end of its movable range on the object lens side. In this state, the right end of the magnets 312 provided on the movable lens frame 311 in the drawing faces the position detection sensor 47 and thus the position detection sensor 47 can detect a position of the object-side focus lens 26.

In addition, when an ultrasonic motor or a DC motor is used as the motor 301, driving control of the motor 301 is generally performed by a speed servo rather than by a position servo due to factors such as rattling and responsiveness of a mechanical part. In the same manner, also in the imaging system 1, driving control of the motor 301 is performed by a speed servo based on a detection result of a driving state such as a rotation angle of the motor 301 output from the driving state detection sensor 49.

By providing the driving state detection sensor 49 in the vicinity of the motor 301 in the interchangeable lens 10, influence of rattling of the transmission mechanism 302 or the like can be reduced, and thus a driving state of the motor 301 can be detected with higher accuracy. Accordingly, the motor 301 can be smoothly driven.

The motor 301 and the transmission mechanism 302 of the example shown in FIG. 4 correspond to the object-side lens driving unit 48 shown in FIG. 1.

Figure 8:
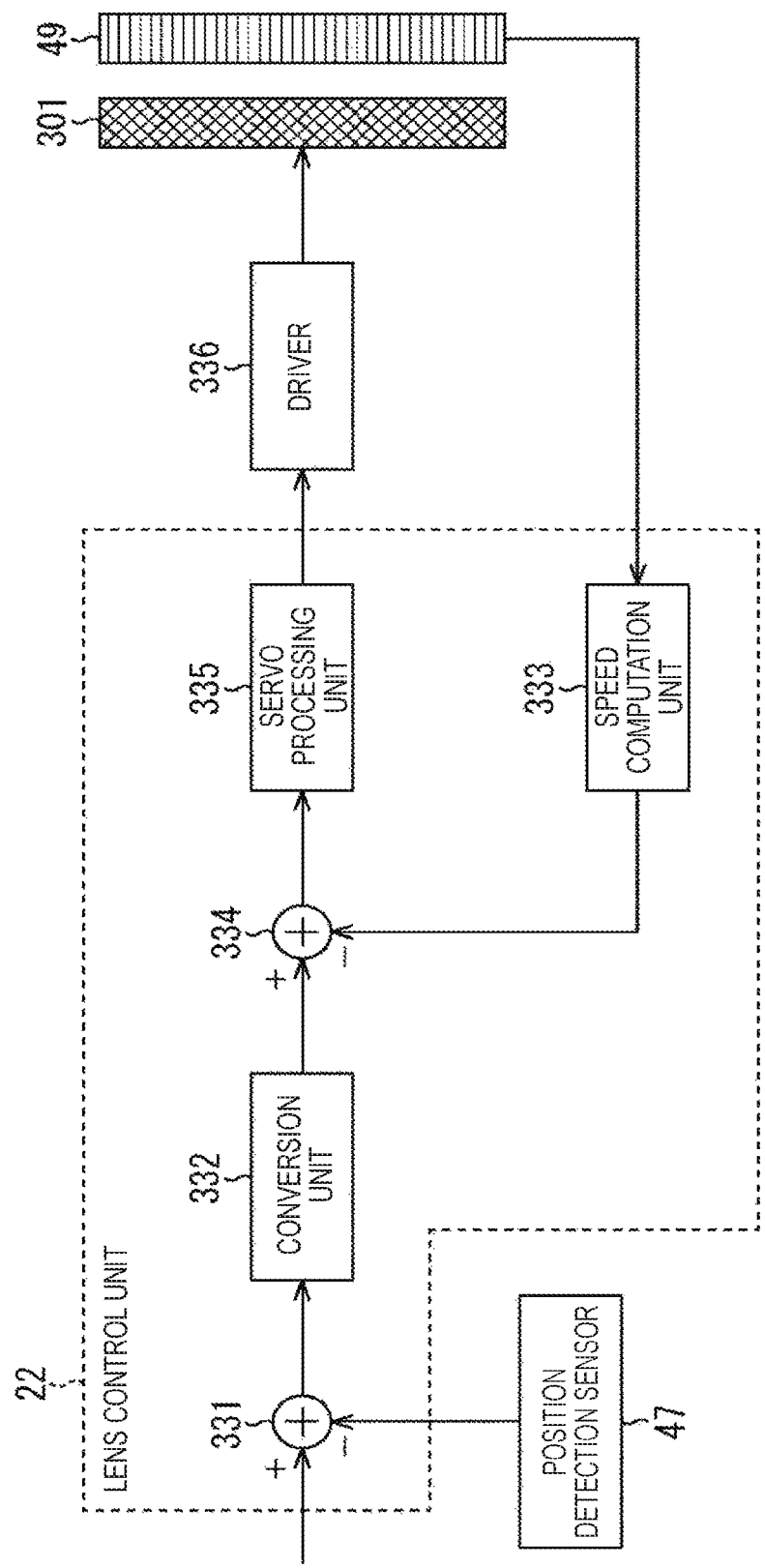
FIG. 8 is a diagram showing a configuration example of a block that drives a focus lens.

Furthermore, a configuration of a block to drive the object-side focus lens 26 using a speed servo in the imaging system 1 shown in FIG. 1 is, for example, as shown in FIG. 8. Note that the same reference numerals are given to the elements in FIG. 8 that correspond to those of FIG. 4 or 1, and description thereof will be appropriately omitted.

In the example shown in FIG. 8, the block to drive the object-side focus lens 26 in the imaging system 1 includes the position detection sensor 47, a difference computation unit 331, a conversion unit 332, a speed computation unit 333, a difference computation unit 334, a servo processing unit 335, a driver 336, the motor 301, and the driving state detection sensor 49. Note that illustration of the transmission mechanism 302 and the object-side focus lens 26 is omitted here.

The difference computation unit 331 computes the difference between a target position that is a position of a movement destination supplied from the lens control unit 22 that the object-side focus lens 26 aims for and an actual position of the object-side focus lens 26 supplied from the position detection sensor 47 at a current time, and supplies the difference to the conversion unit 332 as an amount of error. This amount of error indicates an amount of movement from the current actual position of the object-side focus lens 26 to the target position, i.e., an amount of movement by which the object-side focus lens 26 should move to arrive at the target position.

The conversion unit 332 converts an amount of error supplied from the difference computation unit 331 into a target speed that is a rotation speed that the motor 301 aims for according to the amount of error, and supplies the result to the difference computation unit 334. Note that the conversion of the amount of error into the target speed may be performed in any form such as an arithmetic operation using, for example, a conversion table prepared in advance or a calculation formula; however, description will be continued hereinbelow on the assumption that the conversion into the target speed is performed using a conversion table.

The speed computation unit 333 computes a rotation speed of the motor 301 based on a detection result of a driving state of the motor 301 supplied from the driving state detection sensor 49, and supplies the obtained rotation speed to the difference computation unit 334 as speed information.

The difference computation unit 334 computes the difference between the target speed supplied from the conversion unit 332 and the rotation speed indicated by the speed information supplied from the speed computation unit 333, and supplies the difference obtained therefrom to the servo processing unit 335 as a speed deviation.

Here, since the speed deviation is the difference between the rotation speed for which the motor 301 should aim and the rotation speed of the current time, if the rotation speed of the motor 301 is changed to the extent of the speed deviation, the rotation speed of the motor 301 becomes the target speed.

The servo processing unit 335 controls driving of the motor 301 using a proportional integral difference (PID) servo based on the speed deviation supplied from the difference computation unit 334. In other words, the servo processing unit 335 decides a control value for changing the rotation speed of the motor 301 based on the speed deviation from the difference computation unit 334 and supplies the control value to the driver 336. Note that the control value is set to be, for example, a digital voltage signal or the like.

The driver 336 converts the control value supplied from the servo processing unit 335 into a control signal, for example, an analog voltage signal or the like, and supplies the signal to the motor 301 to drive the motor 301. In other words, the driver 336 actually drives the motor 301 according to control of the servo processing unit 335.

In addition, in the configuration shown in FIG. 8, the difference computation unit 331, the conversion unit 332, the speed computation unit 333, the difference computation unit 334, and the servo processing unit 335 are realized by, for example, the lens control unit 22 executing a control program recorded in the recording unit 30. In addition, the driver 336, for example, is set to be a block constituting the object-side lens driving unit 48.

As described with reference to FIG. 8, in the imaging system 1, driving of the motor 301 is controlled by the speed servo to drive the object-side focus lens 26. At that time, the rotation speed of the motor 301 may be set to be controlled as shown in, for example, FIG. 9.

Figure 9:
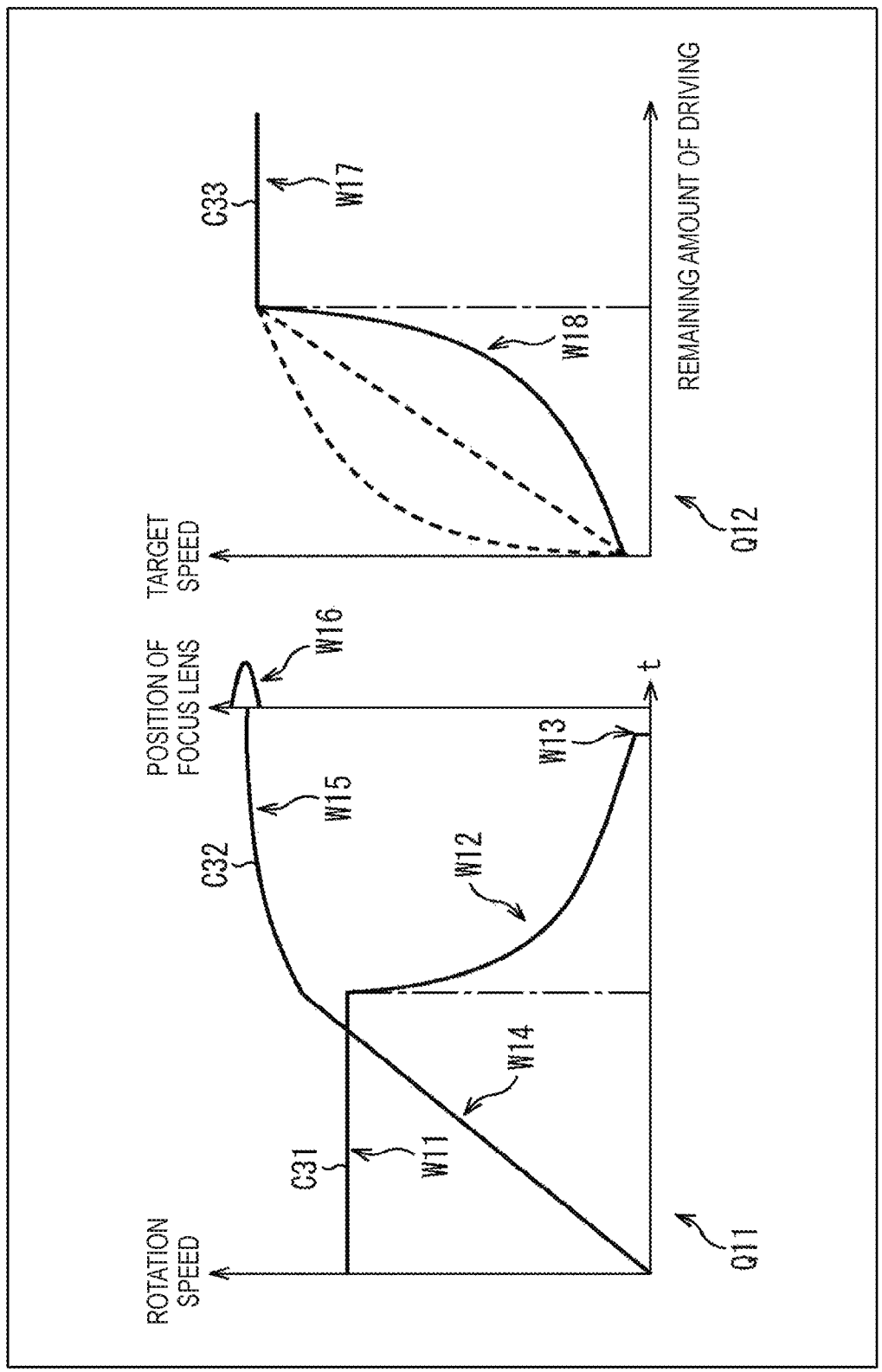
FIG. 9 is a diagram for describing control of a rotation speed of a motor.

In FIG. 9, the curve C31 and the curve C32 drawn in the portion indicated by the arrow Q11 each represent the rotation speed of the motor 301 and the position of the object-side focus lens 26 at each time. With respect to the curve C31, the vertical axis represents rotation speeds and the horizontal axis represents times. With respect to the curve C32, the vertical axis represents positions of the object-side focus lens 26 and the horizontal axis represents times.

In addition, the curve C33 drawn in the portion indicated by the arrow Q12 represents a remaining amount of driving (amount of movement) to the target position of the object-side focus lens 26, i.e., a target speed of the motor 301 with regard to an amount of error described above. Thus, with respect to the curve C33, the vertical axis represents target speeds and the horizontal axis represents remaining amounts of driving.

At the time of control of driving of the motor 301 using the speed servo, for example, a rotation speed of the motor 301 is set to be fast when the driving starts, i.e., when a movement to the target position starts, and then the driving is performed at a constant speed as shown in the portion of the curve C31 indicated by the arrow W11.

In addition, the rotation speed of the motor 301 is thereafter gradually lowered as shown in the portion indicated by the arrow W12, and then the driving of the motor 301 stops before the object-side focus lens 26 arrives at the target position, i.e., prior to its arrival at the target position as shown in the portion indicated by the arrow W13.

Here, as the rotation speed of the motor 301 is lowered, the movement speed of the object-side focus lens 26 gradually decreases as well, and the movement speed of the object-side focus lens 26 also decreases due to friction inside the motor 301 or friction of the transmission mechanism 302. Then, after the stop of the driving of the motor 301, the object-side focus lens 26 smoothly stops due to the friction described above.

Owing to the control of the driving of the motor 301 described above, the object-side focus lens 26 significantly moves at the constant speed when the driving starts as shown in the portion of the curve C32 indicated by the arrow W14, then the movement speed gradually becomes slower as shown in the portion indicated by the arrow W15, and the object-side focus lens 26 comes to a stop at the position within a predetermined range indicated by the arrow W16. In other words, the speed of the motor 301 is controlled such that the driving is performed at a low speed immediately before the stop of the object-side focus lens 26, and finally, the object-side focus lens 26 smoothly stops due to frictional force.

Here, the curve indicated by the arrow W16 represents a predetermined degree of range around the target position of the object-side focus lens 26, and if it is possible to move the object-side focus lens 26 within the range, the object-side focus lens can be said to stop at the target position. In other words, the curve indicated by the arrow W16 represents a range in which a shift from the target position is permissible. Hereinbelow, the predetermined degree of range that includes the target position indicated by the arrow W16 will also be referred to particularly as a target arrival range.

In order to perform the control of the driving of the motor 301 as described above, for example, a target speed may be changed according to the remaining amount of driving as represented by the curve C33. The curve C33 is set as a speed curve representing the relation between the remaining amount of driving and the target speed. In this example, while a constant target speed is set regardless of a remaining amount of driving in the portion indicated by the arrow W17 in which the remaining amount of driving is large, the target speed is lowered as the remaining amount of driving decreases in the part indicated by the arrow W18 in which the remaining amount of driving is small.

In deciding the speed curve, the portion of the curve C33 indicated by the arrow W18 may be decided particularly according to the portion of the curve C31 indicated by the arrow W12. If the speed curve is decided according to, for example, a characteristic such as friction or a mechanical structure of the motor 301 and the transmission mechanism 302, the relation between an actual position of the object-side focus lens 26 before a movement and a target position thereof, whether it is during capturing of a dynamic image or during capturing of a still image, or the like, appropriate control of driving is possible.

In addition, the portion of the curve C33 indicated by the arrow W18 may be changed, for example, as indicated by the dotted lines.

The conversion unit 332 shown in FIG. 8 retains one or a plurality of conversion tables that meet a condition, for example, a conversion table corresponding to the curve C33, and an amount of error is converted into a target speed using the retained conversion tables.

<Description of an Imaging Process>

Next, an operation of the imaging system 1 will be described. First, an imaging process performed by the imaging system 1 will be described with reference to the flowchart of FIG. 10.

In Step S11, the body control unit 72 determines whether a mode is a dynamic image photographing mode. Here, the dynamic image photographing mode refers to a photographing mode in which a dynamic image is captured, and the body control unit 72 determines whether the mode is the dynamic image photographing mode based on, for example, an operation signal from the operation unit 82.

When the mode is determined to be the dynamic image photographing mode in Step S11, the process thereafter proceeds to Step S15.

On the other hand, when the mode is determined not to be the dynamic image photographing mode in Step S11, in other words, when the photographing mode is a still image photographing mode in which a still image is captured, the body control unit 72 determines whether the release button serving as the operation unit 82 has been half-pressed in Step S12. The determination of whether the release button has been half-pressed is made based on an operation signal supplied from the release button to the body control unit 72.

When the release button is determined to have been half-pressed in Step S12, the imaging device 60 performs an AF control process in Step S13. Note that, in the AF control process, a process of detecting a peak position is performed, and the detection result of the peak position is output as a target position. Accordingly, in the interchangeable lens 10, a lens driving process is performed, the object-side focus lens 26 and the sensor-side focus lens 27 are moved to a position obtained from the peak position, and therefore the focus is on a subject.

In Step S14, the body control unit 72 determines whether the release button serving as the operation unit 82 has been fully pressed. The determination of whether the release button has been fully pressed is made based on an operation signal supplied from the release button to the body control unit 72.

When the release button is determined not to have been fully pressed in Step S14, the process of Step S14 is repeated until the release button is determined to have been fully pressed.

When the release button is determined to have been fully pressed in Step S14, the process proceeds to Step S19, and an image capturing process is performed as will be described below.

In addition, when the mode is determined to be the dynamic image photographing mode in Step S11, or when the release button is determined not to have been half-pressed in Step S12, the focus control unit 91 determines whether an AF mode has been decided in Step S15 based on an operation signal from the operation unit 82.

Here, even in focus control based on the contrast AF in the imaging system 1, a plurality of AF modes in which control methods, AF parameters to be used in the control, conversion tables to be used by the conversion unit 332, and the like differ are decided. Here, the AF mode is information indicating an operation mode at the time of autofocusing.

The focus control unit 91 decides a proper AF mode according to whether a still image is to be captured or a dynamic image is to be captured, i.e., according to a photographing mode or the like. In addition, an AF mode may be designated by, for example, a user operation. Furthermore, for example, only one AF mode may be set for a photographing mode so that a user is not allowed to designate an AF mode.

When it is determined that no AF mode has been decided in Step S15, the process of Step S15 is repeated until an AF mode is decided.

On the other hand, when it is determined that an AF mode has been decided in Step S15, the AF control process is performed in Step S16. This AF control process is the same process as the process of Step S13.

In Step S17, the body control unit 72 controls the shutter driving unit 75 and the image sensor 76 to cause the image sensor 76 to capture an image.

In other words, the shutter driving unit 75, the mechanical shutter 73, the image sensor 76, and the like are operated according to control of the body control unit 72. For example, the image sensor 76 captures images and sequentially supplies the obtained images to the image signal processing unit 77. In addition, the image signal processing unit 77 performs various processes such as demosaicing on the images from the image sensor 76, supplies the images to the display unit 79 to display them thereon, and the like.

Here, when a dynamic image is being recorded in the dynamic image photographing mode, the dynamic image being recorded is captured in Step S17, and during photographing standby in the dynamic image photographing mode or in the still image photographing mode, a through image displayed on the display unit 79 is captured in Step S17.

In Step S18, the body control unit 72 determines whether a dynamic image is being recorded. When it is determined that no dynamic image is being recorded, i.e., it is a photographing standby state in which a through image is displayed, in Step S18, the process returns to Step S11, and the above processes are repeated. In this case, the through image is displayed on the display unit 79.

On the other hand, when it is determined that a dynamic image is being recorded in Step S18, the process proceeds to Step S19.

When it is determined that a dynamic image is being recorded in Step S18 or when the release button is determined to have been fully pressed in Step S14, the image signal processing unit 77 executes a capturing process in Step S19.

Specifically, the image signal processing unit 77 performs various processes such as demosaicing on the images from the image sensor 76 to generate an image for recording in a predetermined file format, and supplies the obtained image for recording to the recording unit 78 as a captured dynamic image or still image to be recorded therein.

After the capturing process is executed on the images in Step S19, the process returns to Step S11, and the above-described processes are repeated until the imaging ends.

Through the steps described above, the imaging system 1 captures a dynamic image or a still image according to a photographing mode.

<Description of the AF Control Process>

Figure 10:
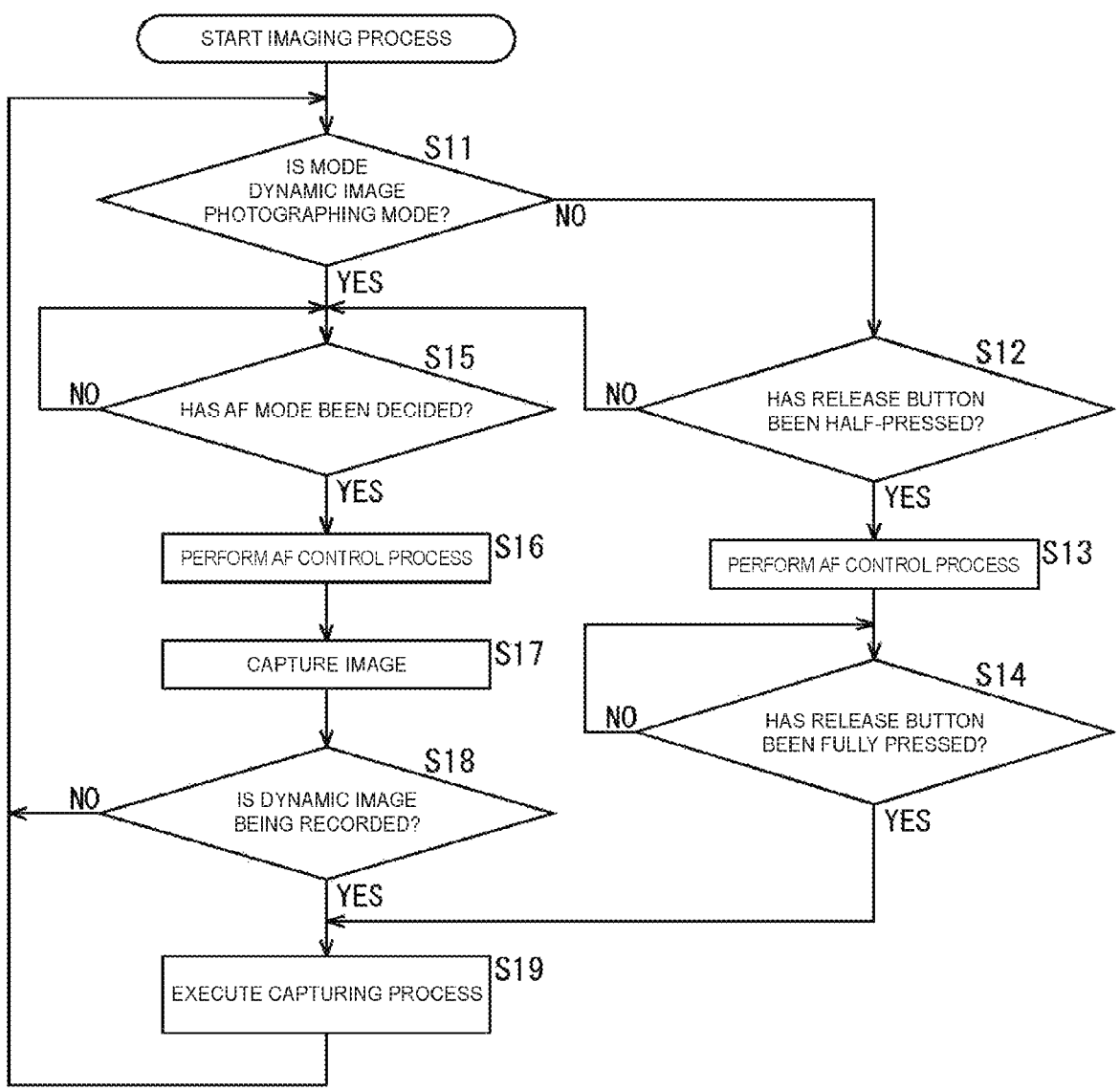
FIG. 10 is a flowchart describing an imaging process.
Figure 11:
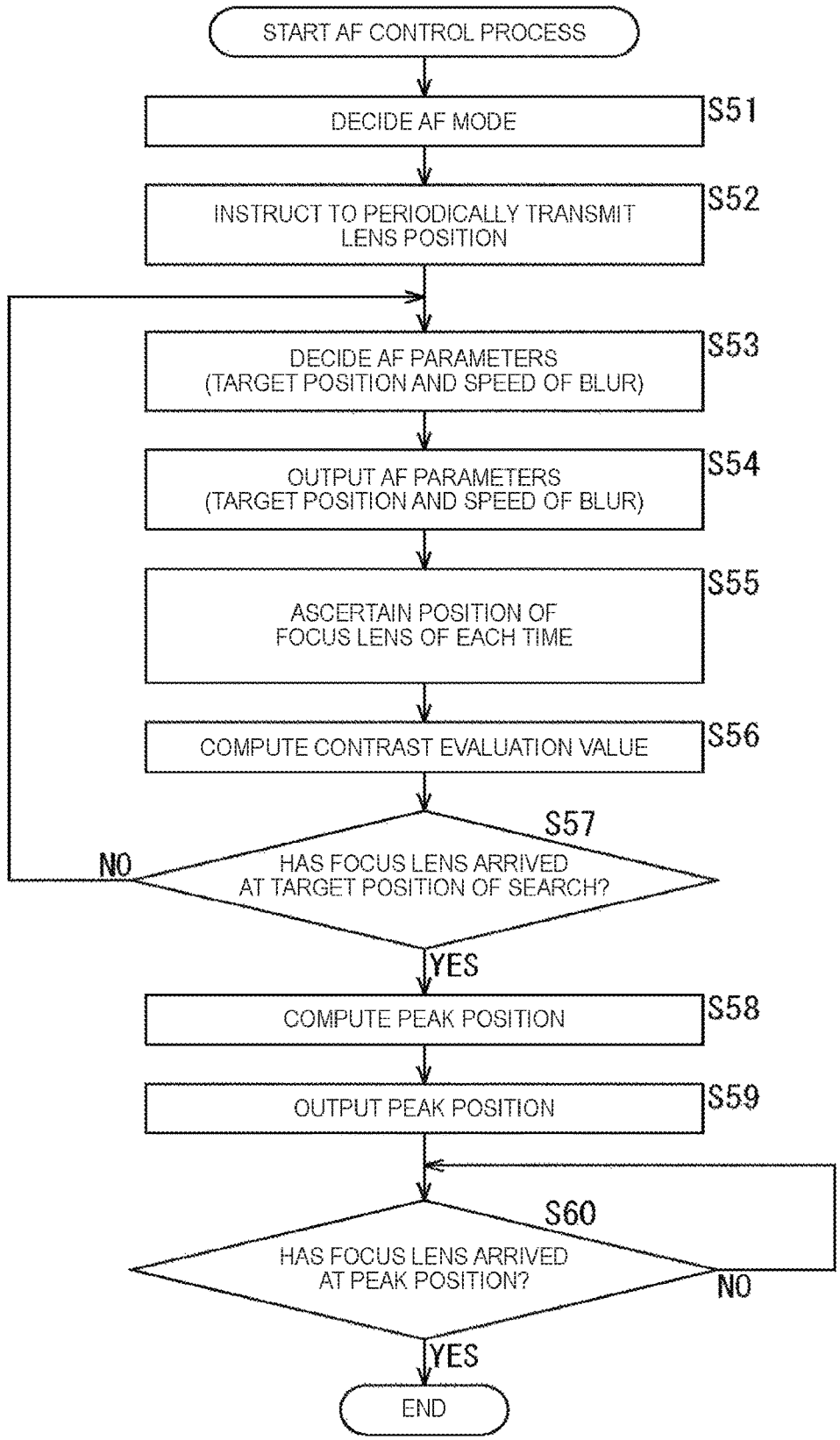
FIG. 11 is a flowchart describing an AF control process.

Next, the AF control process that corresponds to the process of Step S13 of FIG. 10 will be described with reference to the flowchart of FIG. 11. This AF control process starts when a search operation in the contrast AF starts, i.e., when a constant-speed movement starts after approach of the object-side focus lens 26. Note that the same process as the AF control process to be described with reference to FIG. 11 is also performed in Step S16 of FIG. 10; however, since the AF mode is already decided in the process of Step S15 in that case, the process of Step S51 of FIG. 11 is not performed.

In Step S51, the focus control unit 91 decides an AF mode of the contrast AF. In Step S51, an AF mode is decided according to a photographing mode or the like in the same manner as described in the process of Step S15 of FIG. 10. Note that information indicating the decided AF mode or the photographing mode is supplied from the focus control unit 91 to the lens control unit 22 via a terminal BPx and a terminal LPx at an appropriate timing.

In Step S52, the focus control unit 91 instructs the interchangeable lens 10 to perform periodic transmission of lens positions.

More specifically, the focus control unit 91 supplies a command requesting periodic transmission of positions of focus lenses to the lens control unit 22 via a terminal BPx and a terminal LPx. Here, a transmission cycle of a position of the focus lenses can be set to, for example, a cycle of a synchronization signal such as a vertical synchronization signal, or a cycle obtained by multiplying the cycle of the synchronization signal that is periodically communicated between the body control unit 72 and the lens control unit 22.

In Step S53, the focus control unit 91 decides AF parameters based on the decided AF mode, the photographing mode, a detection result with regard to an imaging environment, or the like.

Specifically, for example, the focus control unit 91 decides a target position indicating the movement destination to which the focus lenses of the interchangeable lens 10 should be moved and a speed of blur as the AF parameters.

Here, the target position decided by the focus control unit 91 is a target position decided by regarding the focus lenses of the interchangeable lens 10 including one lens group. For example, the interchangeable lens 10 includes two lens groups that are the object-side focus lens 26 and the sensor-side focus lens 27, i.e., two lens groups, each of which can move independently. For this reason, based on the target position decided by the focus control unit 91, the interchangeable lens 10 side performs conversion to an object-side target position that is a target position of the object-side focus lens 26 and a sensor-side target position that is a target position of the sensor-side focus lens 27 according to the target position.

In addition, the speed of blur indicates an amount of blur of an image formed by the optical system of the interchangeable lens 10 per unit time. The interchangeable lens 10 side obtains a rotation speed of the motor 301 for moving the object-side focus lens 26 and a driving speed of the sensor-side lens driving unit 51 for moving the sensor-side focus lens 27 so that an amount of blur of the image formed by the optical system that includes the object-side focus lens 26 and the sensor-side focus lens 27 changes at the decided speed of blur.

Thus, the slope of the polygonal line C11 in the section from the time t0 to the time t5 shown in FIG. 3, for example, is decided based on the speed of blur. As an example, during capturing of a dynamic image, for example, if a degree of focusing changes at a high rate, the image is difficult to view because it is a dynamic image, and thus the speed of blur is set to be low, and during capturing of a still image, the speed of blur is set to be high in order to quickly performing focusing.

In Step S54, the focus control unit 91 outputs the AF parameters decided in the process of Step S53 to a terminal BPx. The AF parameters output in that manner are supplied to the lens control unit 22 of the interchangeable lens 10 via a terminal BPx and a terminal LPx.

In Step S55, the focus control unit 91 ascertains positions of the focus lenses of each time.

For example, the lens control unit 22 periodically transmits detection results of the focus lenses constituting the interchangeable lens 10 to the body control unit 72 according to the command of Step S52. Thus, the body control unit 72 retains the detection results of the positions of the focus lenses transmitted up to the current time immediately after a start of the search operation based on the contrast AF. The focus control unit 91 reads and checks the positions of the focus lenses of each time retained by the body control unit 72 as described above.

Here, the positions of the focus lenses constituting the interchangeable lens 10 are positions of the focus lenses obtained from a position of the object-side focus lens 26 detected by the position detection sensor 47 and a position of the sensor-side focus lens 27 detected by the sensor-side lens position detection unit 50 when the focus lenses of the interchangeable lens 10 are regarded as including one lens group.

In Step S56, the focus control unit 91 computes contrast evaluation values of images of respective times supplied from the image signal processing unit 77. For example, the focus control unit 91 computes contrast evaluation values by computing contrast of respective regions of an image.

In Step S57, the focus control unit 91 determines whether the focus lenses have arrived at the target position of the search based on the contrast AF. For example, the focus control unit 91 determines that the focus lenses have arrived at the target position when the process of Step S101 of FIG. 12 to be described below is performed and information that the focus lenses have arrived at the target position transmitted in Step S54 is supplied from the lens control unit 22.

Here, the target position of the search refers to an end position of the search range, i.e., a search end position at which a search operation ends. The imaging device 60 sequentially outputs positions up to the search end position as target positions until the focus lenses arrive at the search end position, and finally moves the focus lenses to the search end position. Note that the processes of Steps S53 to Step S57 are repeated at, for example, a cycle of a synchronization signal, a cycle obtained by multiplying the cycle of the synchronization signal, or the like.

When the focus lenses are determined not to have arrived at the target position of the search yet in Step S57, the process returns to Step S53, and the above-described processes are repeated. On the other hand, when the focus lenses are determined to have arrived at the target position of the search in Step S57, the process proceeds to Step S58.

In Step S58, the focus control unit 91 detects a peak position.

In other words, the focus control unit 91 performs an interpolation process or the like using contrast evaluation values at each time in the search period and the positions of the focus lenses of respective times obtained in Step S55, and thereby obtains contrast evaluation values of the respective positions of the focus lenses in the search range.

Then, the focus control unit 91 detects the position of the focus lenses with the maximum contrast evaluation value as the peak position. The peak position obtained in that manner is the position of the focus lenses at which contrast of the image captured by the imaging device 60, i.e., the contrast evaluation value, is the maximum.

In Step S59, the focus control unit 91 outputs the peak position obtained in Step S58 to the interchangeable lens 10 via a terminal BPx.

The peak position output as described above becomes a new target position of the focus lenses of the interchangeable lens 10. This peak position is a target position decided by regarding the focus lenses of the interchangeable lens 10 as including one lens group.

The peak position decided as described above, i.e., the target position, can be said to indicate a position that serves as a movement destination of the object-side focus lens 26 decided according to an output of the position detection sensor 47 at each time. In other words, the target position can be said to be a position decided based on the contrast AF according to positions of the object-side focus lens 26 detected by the position detection sensor 47 at respective times and contrast evaluation values obtained for images captured when the object-side focus lens 26 is at the positions.

In addition, the interchangeable lens 10 that has received the supply of the target position performs an operation of moving the focus lenses to the target position.

In Step S60, the focus control unit 91 determines whether the focus lenses of the interchangeable lens 10 have arrived at the peak position.

Figure 12:
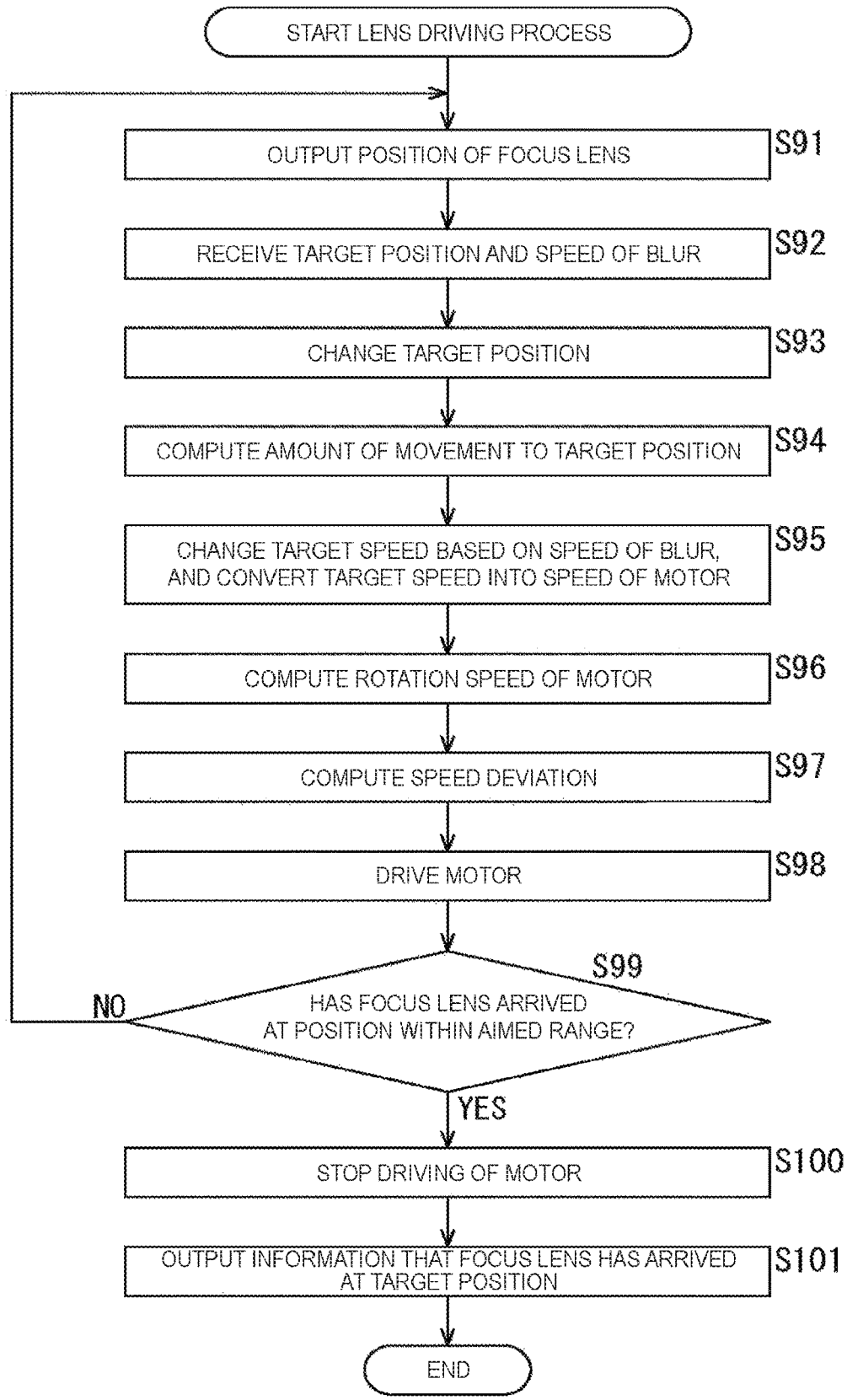
FIG. 12 is a flowchart describing a lens driving process.

For example, when the object-side focus lens 26 and the sensor-side focus lens 27 arrive at the final target position of their focus lenses, the lens control unit 22 notifies the focus control unit 91 of the fact that the focus lenses have arrived at the peak position serving as the target position via a terminal LPx and the terminal BPx through the process of Step S101 of FIG. 12 to be described below. When the focus control unit 91 receives the notification, the focus control unit 91 determines that the focus lenses have arrived at the peak position in Step S60.

When the focus lenses are determined not to have arrived at the peak position yet in Step S60, the process of Step S60 is repeated until the focus lenses arrive at the peak position.

On the other hand, when the focus lenses are determined to have arrived at the peak position in Step S60, the object-side focus lens 26 and the sensor-side focus lens 27 are moved to the peak position, accordingly a state in which the focus is on an aimed subject, i.e., a focused state, is created and thereby the AF control process ends.

With the operation described above, the imaging device 60 of the imaging system 1 obtains the contrast evaluation values of the image, then detects the peak position, outputs the detected peak position as a target position, and thereby moves the focus lenses to the target position.

<Description of a Lens Driving Process>

Next, a lens driving process performed by the interchangeable lens 10 when the AF control process described with reference to FIG. 11 is performed will be described with reference to the flowchart of FIG. 12. The lens driving process starts when the search operation based on the contrast AF starts, i.e., when a constant-speed movement of the object-side focus lens 26 starts.

In Step S91, the lens control unit 22 outputs a detection result of positions of the focus lenses to a terminal LPx according to the command supplied from the focus control unit 91 in the process of Step S52 of FIG. 11.

In the interchangeable lens 10, detection of a position of the object-side focus lens 26 by the position detection sensor 47 is continuously performed at all times. Likewise, detection of a position of the sensor-side focus lens 27 by the sensor-side lens position detection unit 50 is also continuously performed at all times.

The lens control unit 22 obtains the positions of the focus lenses when the focus lenses that originally includes two lens groups that are the object-side focus lens 26 and the sensor-side focus lens 27 are regarded as including one lens group based on the detection result supplied from the position detection sensor 47 and the detection result supplied from the sensor-side lens position detection unit 50 and outputs the positions to a terminal LPx. The detection result of the positions of the focus lenses of the interchangeable lens 10 output to the terminal LPx is supplied to the body control unit 72 via a terminal BPx. The imaging device 60 ascertains the detection result of the positions of the focus lenses output as described above in the process of Step S55 of FIG. 11.

In Step S92, the lens control unit 22 receives the AF parameters transmitted from the focus control unit 91 in the process of Step S54 of FIG. 11, i.e., the target position and the speed of blur.

In Step S93, the lens control unit 22 changes the target position received in Step S92.

The target position output from the focus control unit 91 described above is a target position decided by regarding the focus lenses of the interchangeable lens 10 as including one lens group.

Thus, the lens control unit 22 converts the target position received in Step S92 into an object-side target position that is a target position of the object-side focus lens 26 according to the target position and a sensor-side target position that is a target position of the sensor-side focus lens 27. The lens control unit 22 regards the object-side target position of the object-side focus lens 26 obtained as above as the final target position, and supplies the target position to the difference computation unit 331. Hereinafter, the object-side target position will also be simply referred to as a target position.

Note that, although detailed description will be omitted here, the lens control unit 22 controls the sensor-side lens driving unit 51 based on the sensor-side target position, and also performs an operation of moving the sensor-side focus lens 27 to the sensor-side target position. In addition, the example in which the focus lenses constituting the interchangeable lens 10 includes two focus lens groups that are the object-side focus lens 26 and the sensor-side focus lens 27 has been described. However, when the focus lenses constituting the interchangeable lens 10 includes one lens group, i.e., when they include only the object-side focus lens 26, the process of Step S93 is not performed, and only the target position received in Step S92 is used.

In Step S94, the difference computation unit 331 subtracts the position of the object-side focus lens 26 supplied from the position detection sensor 47 from the target position of the object-side focus lens 26 supplied from the lens control unit 22 to compute an amount of movement to the target position, i.e., an amount of error. The difference computation unit 331 supplies the computed amount of error to the conversion unit 332.

In Step S95, the lens control unit 22 changes a target speed based on the speed of blur received in Step S92, and converts the target speed into a speed of the motor 301.

For example, the lens control unit 22 decides a speed curve indicating the relation between a remaining amount of driving (the amount of error) and the target speed based on the photographing mode, an AF mode, the AF parameters, the relation between the position of the object-side focus lens 26 before the start of movement to the target position and the target position, and the like.

At this time, for example, the lens control unit 22 restricts the target speed, i.e., the rotation speed of the motor 301, based on the speed of blur if necessary. Specifically, a speed of the portion indicated by the arrow W17 on the curve C33 of FIG. 9, i.e., the portion in which an operation is performed at a constant speed, for example, is decided based on the speed of blur. The lens control unit 22 restricts the target speed by lowering the speed of the portion in which an operation is performed at a constant speed, i.e., the portion in which the target speed is the maximum speed, if necessary. In other words, a limit is imposed on the target speed.

The lens control unit 22 designates a conversion table for driving the motor 301 along the decided speed curve as a conversion table to be used for the speed servo for the conversion unit 332.

The conversion unit 332 uses the conversion table designated by the lens control unit 22 to convert the amount of error into the target speed, and supplies the result to the difference computation unit 334. Note that, when the target speed is computed through an arithmetic operation, for example, instead of the conversion table, an arithmetic operation based on a coefficient decided using the decided speed curve is performed on the amount of error to compute the target speed.

In Step S96, the speed computation unit 333 computes a rotation speed of the motor 301 based on the detection result of the driving state of the motor 301 supplied from the driving state detection sensor 49, and supplies the obtained rotation speed to the difference computation unit 334 as speed information.

For example, the driving state detection sensor 49 detects driving states of the motor 301, i.e., rotation speeds of the motor 301, at all times, for example, and supplies the detection results to the speed computation unit 333. The speed computation unit 333 computes a rotation speed of the motor 301 based on the detection results of the driving states supplied from the driving state detection sensor 49.

In Step S97, the difference computation unit 334 computes the speed deviation by subtracting the rotation speed indicated by the speed information supplied from the speed computation unit 333 from the target speed supplied from the conversion unit 332, and supplies the speed deviation to the servo processing unit 335.

Through the processes of Step S94 to Step S97 above, a driving speed of the motor 301 that is based on the difference between the target speed, which is based on the difference between the target position supplied from the imaging device 60, more specifically, the object-side target position and the output of the position detection sensor 47, and a rotation speed obtained from an output of the driving state detection sensor 49 is decided.

In Step S98, the servo processing unit 335 controls the driver 336 based on the speed deviation supplied from the difference computation unit 334 to drive the motor 301.

For example, the servo processing unit 335 obtains a control value to change the rotation speed of the motor 301 according to the speed deviation, and supplies the control value to the driver 336. Note that, at this time, the speed deviation may be changed so that the rotation speed of the motor 301 does not exceed a pre-decided speed, if necessary. In addition, the driver 336 converts the control value supplied from the servo processing unit 335 into a control signal and outputs the signal to the motor 301 to drive the motor 301.

The motor 301 rotates according to the control signal supplied from the driver 336 to drive the transmission mechanism 302, thereby moving the object-side focus lens 26.

More specifically, if the motor 301 is driven, for example, the driving is transmitted to the transmission mechanism 302, and accordingly the movable lens frame 311 shown in FIG. 6 to which the object-side focus lens 26 is fixed is moved by the cam ring 315 serving as the transmission mechanism 302. Then, the object-side focus lens 26 that is held by (fixed to) the movable lens frame 311 is also moved integrally with the movable lens frame 311.

In the driving control of the motor 301 realized by performing Steps S94 to S98, for example, control by the lens control unit 22 is performed to drive the motor 301 along the decided speed curve.

Specifically, immediately after the start of the search operation after run-up ends, for example, the motor 301 is controlled to rotate (operate) at a constant speed, and then controlled such that the rotation speed of the motor 301 gradually decreases along the speed curve and then the motor stops.

In Step S99, the lens control unit 22 determines whether the object-side focus lens 26 has arrived at a position within an aimed range based on the detection result output from the position detection sensor 47.

The aimed range referred to here is a predetermined degree of target arrival range that includes the target position represented by, for example, the curve indicated by the arrow W16 of FIG. 9. Thus, in Step S99, it is determined whether the object-side focus lens 26 has arrived at a position within the target arrival range that includes the target position obtained in Step S93.

When it is determined that the lens has not yet arrived at a position within the aimed ranged in Step S99, the process returns to Step S91, and the above-described processes are repeated. Note that the processes from Steps S91 to S99 are repeated at, for example, the cycle of a synchronization signal, a cycle obtained by multiplying the cycle of the synchronization signal, or the like.

On the other hand, when it is determined that the lens has arrived at a position within the aimed ranged in Step S99, the process proceeds to Step S100.

In Step S100, the lens control unit 22 stops driving of the motor 301.

As described above, if driving of the motor 301 is stopped at the time at which the object-side focus lens 26 arrives in the target arrival range, i.e., immediately before the object-side focus lens 26 arrives at the target position, the object-side focus lens 26 thereafter stops at the target position or in its vicinity due to friction of the motor 301 or the transmission mechanism 302.

In Step S101, the lens control unit 22 outputs information that the focus lens has arrived at the target position to a terminal LPx, and terminates the lens driving process. The information that the focus lens has arrived at the target position output as described above is supplied to the focus control unit 91 via a terminal LPx and a terminal BPx. When the information that the focus lens has arrived at the target position is output as described above, it is determined in Step S57 of FIG. 11 that the focus lens has arrived at the target position of the search. Note that the process of Step S100 may be performed after the process of Step S101 is performed.

After the lens driving process is performed according to the AF parameters output in Step S53 of FIG. 11 as described above, the peak position is output as a new target position in Step S59 of FIG. 11. Then, the same process as the lens driving process described with reference to FIG. 12 is performed in the interchangeable lens 10.

In such a case, however, only the peak position is received as a target position in Step S92 in the lens driving process. In addition, in Step S95, a predetermined speed, for example, is used instead of the speed of blur. Furthermore, in Step S99, it is determined whether the focus lens has arrived at a position within the target arrival range that includes the peak position serving as the target position.

Then, when the lens driving process in which the peak position is set as the target position is performed, the object-side focus lens 26, more specifically, the focus lens of the interchangeable lens 10, is moved to a focus position, and thus a state in which focus is on a subject is created.

As described above, the interchangeable lens 10 of the imaging system 1 obtains a target speed based on the difference between a target position supplied from the imaging device 60 and an output of the position detection sensor 47, and then decides a driving speed of the motor 301 based on the difference between the target speed and a rotation speed obtained from an output of the driving state detection sensor 49.

At this time, as the position detection sensor 47 that is provided in the vicinity of the object-side focus lens 26 detects a position of the object-side focus lens 26, the position can be more exactly detected, and as a result, the focus can be taken with higher accuracy. Since the position detection sensor 47 is provided on the inner wall side of the fixed lens barrel 313 as described above, for example, the position detection sensor 47 faces the magnets 312 that are fixed to the movable lens frame 311 at all times regardless of a position of the movable lens frame 311, and accordingly, position detection can be performed more exactly.

Note that the present technology is also useful when the sensor-side focus lens 27 is moved to a desired target position using a speed servo. In addition, although the example in which the focus lenses constituting the interchangeable lens 10 include the object-side focus lens 26 and the sensor-side focus lens 27 has been described above, the focus lenses constituting the interchangeable lens 10 may only include the object-side focus lens 26.

The series of processes described above can be executed not only by hardware but also by software. When the series of processes are executed by software, a program constituting the software is installed in the recording unit 30 of the imaging system 1 shown in FIG. 1 or the like.

In this case, the series of processes described above are performed by, for example, the lens control unit 22 reading the control program from the recording unit 30 and executing the program, or the body control unit 72 executing a control program recorded in advance or the like.

Note that a control program for realizing the series of processes described above may be a program in which the processes are performed in a time series manner in the order described in the present specification, or may be a program in which the processes are performed in parallel or at a necessary timing such as when there is a call.

An embodiment of the disclosure is not limited to the embodiments described above, and various changes and modifications may be made without departing from the scope of the disclosure.

Further, each step described by the above-mentioned flow charts can be executed by one device or by allocating a plurality of devices.

In the case where a plurality of processes are included in one step, the plurality of processes included in this one step can be executed by one device or by sharing a plurality of devices.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An interchangeable lens including:
a lens position detection unit configured to detect a position of a lens;
a motor configured to move a movable lens frame to which the lens is fixed;
a driving state detection unit configured to detect a driving state of the motor; and
a control unit configured to decide a driving speed of the motor based on a difference between a target speed, which is based on a difference between a target position of the lens acquired from an imaging device and the position of the lens detected by the lens position detection unit, and a speed according to the driving state detected by the driving state detection unit.

(2) The interchangeable lens according to (1), wherein the target position is a position decided according to a position of the lens detected by the lens position detection unit.

(3) The interchangeable lens according to (2), wherein the target position is a position decided using contrast autofocus.

(4) The interchangeable lens according to any one of (1) to (3), wherein the driving state is a rotation angle of the motor.

(5) The interchangeable lens according to (4), wherein the motor is a ring-shaped ultrasonic motor.

(6) The interchangeable lens according to any one of (1) to (3), wherein the driving state is a rotation angle of a shaft of the motor.

(7) The interchangeable lens according to (6), wherein the motor is a DC motor.

(8) The interchangeable lens according to (3), wherein the lens is a focus lens.

(9) The interchangeable lens according to (8), further including:
a second focus lens with a higher f-number than the focus lens serving as a first focus lens,
wherein the lens position detection unit detects a position of the first focus lens.

(10) The interchangeable lens according to (3), wherein the lens position detection unit is disposed at a position inside of a lens barrel at which a position of the lens can be detected regardless of a position of the movable lens frame that can move with respect to the lens barrel within a movable range of the movable lens frame.

(11) The interchangeable lens according to (3), wherein the control unit causes the motor to be operated at a constant driving speed at a search start time in the contrast autofocus, and stops driving of the motor before the lens arrives at the target position.

(12) The interchangeable lens according to (11), further including:
a driving system configured to transmit driving of the motor to the movable lens frame,
wherein, after a stop of driving of the motor, the movable lens frame stops due to friction of the driving system.

(13) The interchangeable lens according to (11), wherein the control unit gradually lowers the driving speed of the motor according to a speed curve decided based on a relation between a position of the lens before a movement and the target position.

(14) The interchangeable lens according to (13), wherein the control unit decides the speed curve according to information of an operation mode of autofocus acquired from the imaging device.

(15) A driving method of an interchangeable lens mounted on an imaging device, the method including:
detecting a position of a lens by a lens position detection unit;
detecting a driving state of a motor that moves a movable lens frame to which the lens is fixed by a driving state detection unit; and
deciding a driving speed of the motor based on a difference between a target speed, which is based on a difference between a target position of the lens acquired from the imaging device and a position of the lens detected by the lens position detection unit, and a speed according to the driving state detected by the driving state detection unit.

(16) An electronic apparatus including:
a lens position detection unit configured to detect a position of a lens;
a motor configured to move a movable lens frame to which the lens is fixed;
a driving state detection unit configured to detect a driving state of the motor; and
a control unit configured to decide a driving speed of the motor based on a difference between a target speed, which is based on a difference between a target position of the lens acquired from an imaging device and a position of the lens detected by the lens position detection unit, and a speed according to the driving state detected by the driving state detection unit.

What is claimed is:

1. An interchangeable lens comprising:
a lens position detection sensor configured to detect a position of a lens;
a motor configured to move a movable lens frame to which the lens is fixed;
a driving state detection sensor configured to respond to a stimulus effected on the driving state detection sensor by the motor, and output a driving state of the motor in response to the stimulus; and
one or more processors configured to:
receive input of the driving state of the motor output from the driving state detection sensor;
compute a first difference between a target position of the lens acquired from an imaging device and the position of the lens detected by the lens position detection sensor;
convert the first difference into a target speed; and
decide a driving speed of the motor using a second difference between the target speed and a speed according to the driving state output by the driving state detection sensor.

2. The interchangeable lens according to claim 1, wherein the target position is decided according to the position of the lens detected by the lens position detection sensor.

3. The interchangeable lens according to claim 2, wherein the target position is decided using contrast autofocus.

4. The interchangeable lens according to claim 3, wherein the driving state is a rotation angle of the motor.

5. The interchangeable lens according to claim 4, wherein the motor is a ring-shaped ultrasonic motor.

6. The interchangeable lens according to claim 3, wherein the driving state is a rotation angle of a shaft of the motor.

7. The interchangeable lens according to claim 6, wherein the motor is a DC motor.

8. The interchangeable lens according to claim 3, wherein the lens is a focus lens.

9. The interchangeable lens according to claim 8, further comprising:
a second focus lens with a higher f-number than the focus lens serving as a first focus lens,
wherein the lens position detection sensor is configured to detect the position of the first focus lens.

10. The interchangeable lens according to claim 3, wherein the lens position detection sensor is disposed at a position inside of a lens barrel at which a position of the lens can be detected regardless of a position of the movable lens frame that can move with respect to the lens barrel within a movable range of the movable lens frame.

11. The interchangeable lens according to claim 3, wherein the one or more processors is configured to cause the motor to be operated at a constant driving speed at a search start time in the contrast autofocus, and stop driving of the motor before the lens arrives at the target position.

12. The interchangeable lens according to claim 11, further comprising:
a driving system configured to transmit driving of the motor to the movable lens frame,
wherein, after the driving of the motor is stopped, the movable lens frame stops due to friction of the driving system.

13. The interchangeable lens according to claim 11, wherein the one or more processors is configured to gradually lower the driving speed of the motor according to a speed curve decided based on a relation between a position of the lens before a movement and the target position.

14. The interchangeable lens according to claim 13, wherein the one or more processors is configured to decide the speed curve according to information of an operation mode of autofocus acquired from the imaging device.

15. A driving method of an interchangeable lens mounted on an imaging device, the method comprising:
detecting a position of a lens by a lens position detection sensor;
responding to a stimulus effected on a driving state detection sensor by a motor that moves a movable lens frame to which the lens is fixed;
outputting a driving state of the motor in response to the stimulus;
receiving input of the driving state of the motor output from the driving state detection sensor;
computing a first difference between a target position of the lens acquired from an imaging device and the position of the lens detected by the lens position detection sensor;
converting the first difference into a target speed; and
deciding a driving speed of the motor using a second difference between the target speed and a speed according to the driving state output by the driving state detection sensor.

16. An electronic apparatus comprising:
a lens position detection sensor configured to detect a position of a lens;
a motor configured to move a movable lens frame to which the lens is fixed;
a driving state detection sensor configured to respond to a stimulus effected on the driving state detection sensor by the motor, and output a driving state of the motor in response to the stimulus; and
one or more processors configured to:
receive input of the driving state of the motor output from the driving state detection sensor;
compute a first difference between a target position of the lens acquired from an imaging device and the position of the lens detected by the lens position detection sensor;
convert the first difference into a target speed; and
decide a driving speed of the motor using a second difference between the target speed and a speed according to the driving state output by the driving state detection sensor.

17. The interchangeable lens according to claim 1, wherein the position detection sensor is provided at a position closer to the lens than the driving state detection sensor.

18. The interchangeable lens according to claim 1, wherein the position detection sensor is provided near the lens.

19. The interchangeable lens according to claim 8, wherein
the lens includes an object-side focus lens and a sensor-side focus lens, and
the position detection sensor is provided at a position closer to the object-side focus lens than the driving state detection sensor.

20. The interchangeable lens according to claim 19, wherein the position detection sensor detects an actual position of a lens center of the object-side focus lens.

21. The interchangeable lens according to claim 1, wherein the stimulus includes one of an optical stimulus, a magnetic stimulus, and an electrical stimulus.

22. The interchangeable lens according to claim 1, wherein the stimulus includes one of an optical stimulus and a magnetic stimulus.

* * * * *